(12) United States Patent
Yu et al.

(10) Patent No.: US 11,605,081 B2
(45) Date of Patent: Mar. 14, 2023

(54) METHOD AND DEVICE APPLYING ARTIFICIAL INTELLIGENCE TO SEND MONEY BY USING VOICE INPUT

(71) Applicant: SAMSUNG ELECTRONICS CO., LTD., Suwon-si (KR)

(72) Inventors: Seung-hak Yu, Yongin-si (KR); Min-seo Kim, Seoul (KR); In-chul Hwang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 660 days.

(21) Appl. No.: 15/817,659

(22) Filed: Nov. 20, 2017

(65) Prior Publication Data
US 2018/0144346 A1    May 24, 2018

(30) Foreign Application Priority Data

Nov. 21, 2016   (KR) .................. 10-2016-0154879
Oct. 12, 2017   (KR) .................. 10-2017-0132758

(51) Int. Cl.
*G06Q 20/40* (2012.01)
*G06F 21/32* (2013.01)
(Continued)

(52) U.S. Cl.
CPC ......... *G06Q 20/4014* (2013.01); *G06F 21/32* (2013.01); *G06Q 20/108* (2013.01);
(Continued)

(58) Field of Classification Search
None
See application file for complete search history.

(56) References Cited

U.S. PATENT DOCUMENTS 7,228,277 B2   6/2007 Nagashima
7,258,274 B2   8/2007 Levinas et al.
(Continued)

FOREIGN PATENT DOCUMENTS

GB      2476054      6/2011
JP      2002-199085  7/2002
(Continued)

OTHER PUBLICATIONS

Mayo, Benjamin. "PayPal for iOS updated with Siri SDK integration, send and request money using your voice," 9to5mac.com, (Nov. 10, 2016).*

(Continued)

*Primary Examiner* — Elizabeth H Rosen
(74) *Attorney, Agent, or Firm* — Nixon & Vanderhye, P.C.

(57) ABSTRACT

An example device includes a memory configured to store at least one program; a microphone configured to receive a voice; and at least one processor configured to execute the at least one program to control the device to perform operations for sending money to a recipient. The operations include determining a payment intention of a user based on analyzing the received voice input; retrieving contact information from a stored contact list based on the name of the recipient; transmitting the name and the contact information of the recipient to a bank server together with an amount of money specified in the voice input; receiving remittance details from the bank server; and approving the remittance details. The device may analyze the received voice input by using an artificial intelligence (AI) algorithm.

14 Claims, 16 Drawing Sheets

(51) Int. Cl.
*G10L 17/00* (2013.01)
*G06Q 20/32* (2012.01)
*G06Q 20/10* (2012.01)
*G10L 15/22* (2006.01)
*G10L 17/22* (2013.01)
*G06Q 20/34* (2012.01)

(52) U.S. Cl.
CPC ......... *G06Q 20/32* (2013.01); *G06Q 20/3223* (2013.01); *G06Q 20/40145* (2013.01); *G10L 15/22* (2013.01); *G10L 17/00* (2013.01); *G10L 17/22* (2013.01); *G06Q 20/34* (2013.01); *G10L 2015/223* (2013.01)

(56) References Cited

U.S. PATENT DOCUMENTS

| | | | |
|---|---|---|---|
| 10,460,719 | B1* | 10/2019 | Belin .................. G10L 15/22 |
| 2003/0229588 | A1 | 12/2003 | Falk et al. |
| 2013/0080164 | A1* | 3/2013 | Zanolin .............. G06F 40/232 704/235 |
| 2014/0012749 | A1 | 1/2014 | Lee et al. |
| 2014/0163977 | A1* | 6/2014 | Hoffmeister ........ G10L 15/22 704/232 |
| 2014/0172694 | A1 | 6/2014 | Kanjlia et al. |
| 2015/0149354 | A1 | 5/2015 | McCoy |
| 2016/0292408 | A1* | 10/2016 | Zhang ................ G06F 21/32 |
| 2017/0116657 | A1* | 4/2017 | Oh .................. G06Q 30/0207 |
| 2017/0278089 | A1* | 9/2017 | Kothari ............. G06Q 20/3223 |
| 2018/0218359 | A1* | 8/2018 | Kim .................. G06Q 20/16 |
| 2019/0371298 | A1* | 12/2019 | Hannun ............... G06N 3/084 |

FOREIGN PATENT DOCUMENTS

| | | |
|---|---|---|
| JP | 2006-119851 | 5/2006 |
| KR | 10-2003-0012912 | 2/2003 |
| KR | 2003-0026428 | 4/2003 |
| KR | 10-2013-0082645 | 7/2013 |
| KR | 2014-0003840 | 1/2014 |
| KR | 10-2014-0061047 | 5/2014 |
| KR | 2014-0066467 | 6/2014 |
| KR | 2015-0011755 | 2/2015 |
| WO | 2008/013657 | 1/2008 |

OTHER PUBLICATIONS

Sharma, Gaurav. "VOICE is the new Platform and the Future of Search, Commerce, and Payments," medium.com, (Jul. 16, 2016).*
Mayo, Benjamin. "PayPal for iOS updated with Siri SDK integration, send and request money using your voice," 9to5mac.com, (Nov. 10, 2016). (Year: 2016).*
Sharma, Gaurav. "VOICE is the new Platform and the Future of Search, Commerce, and Payments," medium.com, (Jul. 16, 2016). (Year: 2016).*
Extended Search Report dated Oct. 24, 2019 in counterpart European Patent Application No. 17872539.6.
Search Report dated Feb. 7, 2018 in counterpart International Patent Application No. PCT/KR2017/013226.
Communication pursuant to Article 94(3) dated Jan. 20, 2021 in counterpart EP Application No. 17872539.6.
Examination report dated Mar. 25, 2021 in counterpart IN Application No. 201927022147 and English-language translation.
Summons to attend oral proceedings pursuant to Rule 115(1) EPC dated Feb. 21, 2022 in counterpart EP Application No. 17872539.6.
Notice of Non-Final Rejection dated Jan. 12, 2022 in counterpart Korean Patent Application No. 10-2017-0132758 and English-language translation.
Office Action dated Sep. 13, 2022 in counterpart European Patent Application No. 17872539.6.
Office Action dated Nov. 1, 2022 in counterpart Chinese Patent Application No. 201780071950.5 and English-language translation.

* cited by examiner

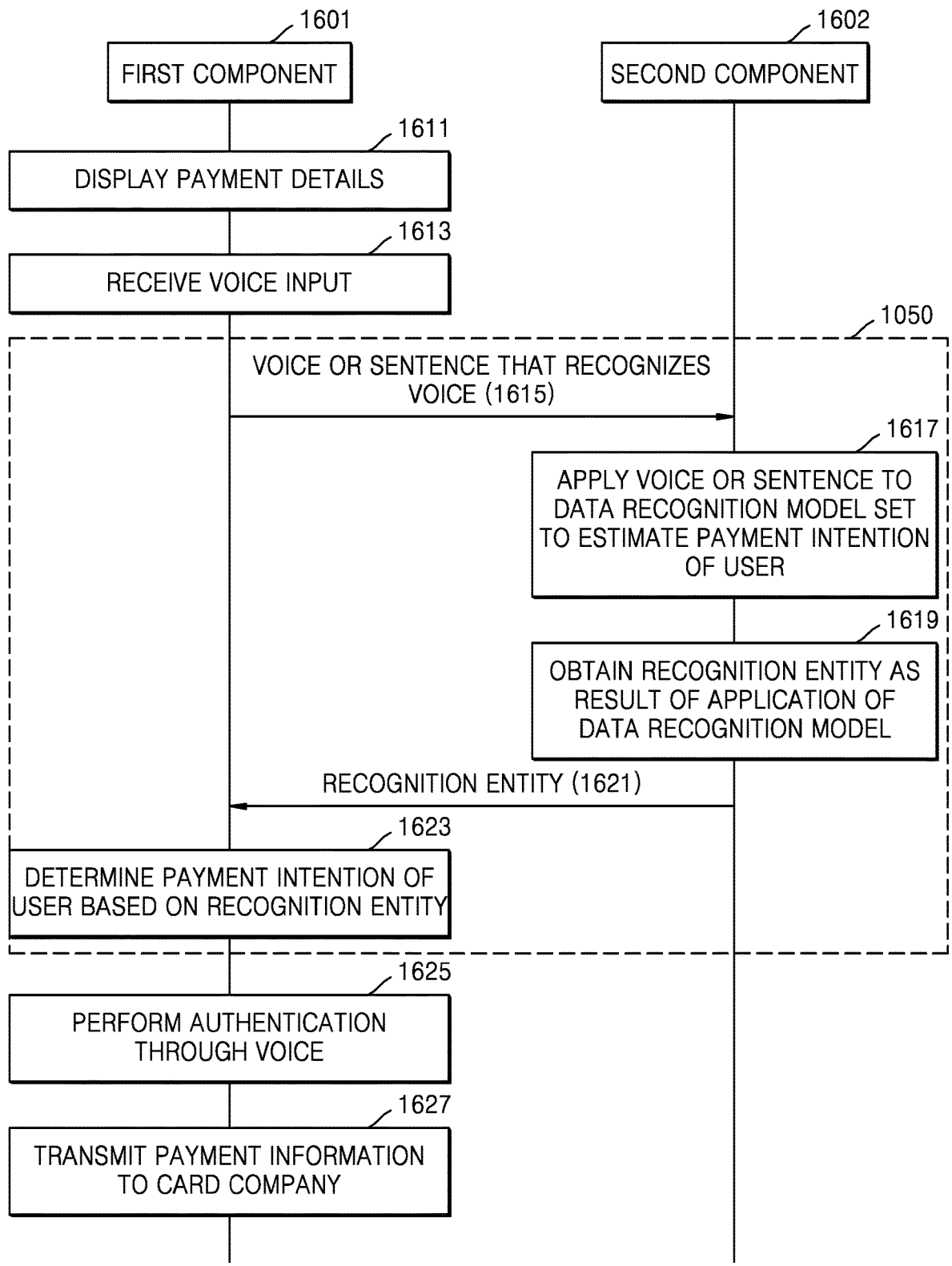

METHOD AND DEVICE APPLYING ARTIFICIAL INTELLIGENCE TO SEND MONEY BY USING VOICE INPUT

CROSS-REFERENCE TO RELATED APPLICATIONS

This application is based on and claims priority under 35 U.S.C. Section 119 to Korean Patent Application No. 10-2016-0154879, filed on Nov. 21, 2016, and to Korean Patent Application No. 10-2017-0132758, filed on Oct. 12, 2017, in the Korean Intellectual Property Office, the disclosures of each of which are incorporated by reference herein in their entireties.

BACKGROUND

1. Field

The present disclosure generally relates to a method and device for sending money using voice input.

The present disclosure also relates to an artificial intelligence (AI) system and its application that simulates functions, such as recognition and determinations of the human brain, using a machine learning algorithm.

2. Description of Related Art

As multimedia technology and network technology have developed, a user may receive various services using a device. In particular, as speech recognition technology has developed, a user may input his or her voice to the device, and the device may perform an operation according to the user's voice (e.g., according to commands spoken by the user).

A user may access a financial service using a device executing an application provided by a bank. For example, the user may send money to an account of a recipient by using the device. The user may execute the application, input an account number, a password, etc., and send money to the account of the recipient.

Also, in recent years, an artificial intelligence (AI) system that implements human-level intelligence has been used in various fields. An AI system is a machine-learning system that learns for itself, makes determinations, and becomes "smarter", unlike existing rule-based systems. The AI system may provide an improved recognition rate and understand user preferences more accurately as it is used, and thus existing rule-based systems are increasingly being replaced by deep-learning based AI systems.

AI technology includes machine learning (e.g., deep learning) and element technologies that utilize machine learning.

Machine learning is an algorithm technology in which the machine itself classifies/learns characteristics of input data. Element technology is technology that simulates functions such as recognition and determinations of the human brain using machine-learning algorithms such as deep learning and includes technical fields such as linguistic understanding, visual understanding, inference/prediction, knowledge representation, motion control, etc.

AI technology has been applied to various fields. Linguistic understanding is technology for recognizing and applying/processing human language/characters and includes natural language processing, machine translation, dialogue system, query/response, speech recognition/synthesis, and the like. Visual understanding is technology for recognizing and processing objects as human vision, and includes object recognition, object tracking, image search, human recognition, scene understanding, spatial understanding, image enhancement, and the like. Inference/prediction is technology for determining and logically inferring and predicting information, and includes knowledge/probability-based inference, optimization prediction, preference-based planning, recommendation, and the like. Knowledge representation is technology for automating experience information of humans into knowledge data and includes knowledge building (generation/classification of data), knowledge management (utilization of data), and the like. Motion control is technology for controlling an autonomous travel of a vehicle and motion of a robot, and includes motion control (navigation, collision, and traveling), operation control (behavior control), and the like.

SUMMARY

A method and a device for sending money to an account of a recipient by using voice are provided.

Additional aspects will be set forth in part in the description which follows and, in part, will be apparent from the description, or may be learned by practice of the disclosed embodiments.

According to an aspect of an example embodiment, a device includes a memory configured to store at least one program; a microphone configured to receive a voice input; and at least one processor configured to execute the at least one program to perform operations for sending money to a recipient, wherein the operations include determining a payment intention of a user based on analyzing the received voice input; retrieving contact information from a stored contact list based on a name of the recipient; transmitting the name and the contact information of the recipient to a bank server together with an amount of money specified in the voice input; receiving remittance details from the bank server; and approving the remittance details According to an aspect of another example embodiment, a paying method includes receiving a voice input of a user; determining a payment intention of a user based on an analysis of the received voice input; retrieving contact information from a stored contact list based on a name of a recipient specified in the voice input; transmitting the name and the contact information of the recipient to a bank server together with an amount specified in the voice input; receiving remittance details from the bank server; and approving the remittance details.

BRIEF DESCRIPTION OF THE DRAWINGS

These and/or other aspects, features and attendant advantages of the present disclosure will become apparent and more readily appreciated from the following detailed description, taken in conjunction with the accompanying drawings, in which like reference numeral refer to like elements and wherein:

FIGS. 15 and 16 are flowcharts of a network system using a data recognition model according to some example embodiments.

DETAILED DESCRIPTION

Figure 1:
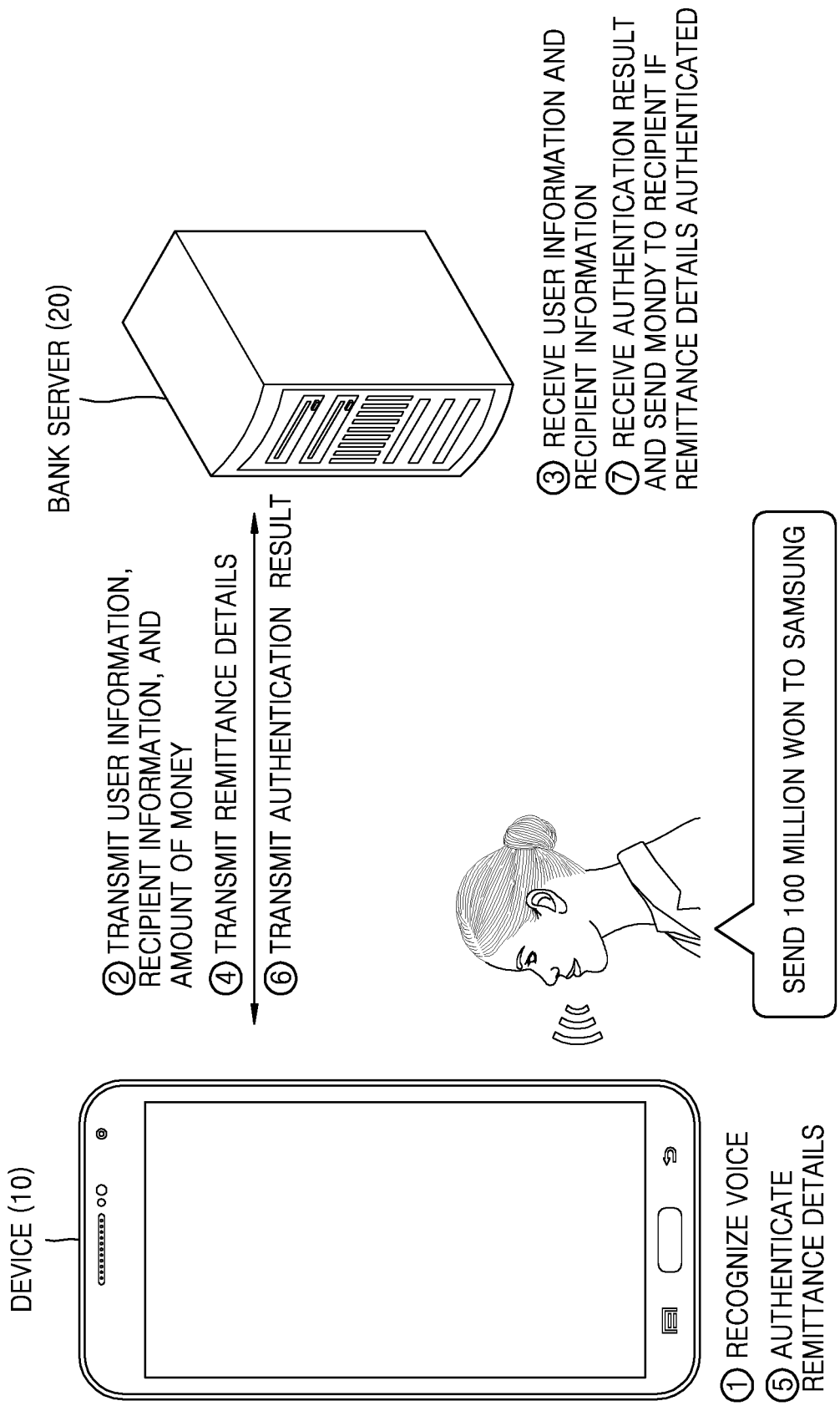
FIG. 1 is a diagram illustrating a method by which a user sends money by using a user's voice, according to an example embodiment.

Reference will now be made in detail to various non-limiting embodiments, examples of which are illustrated in the accompanying drawings. In the drawings, parts irrelevant to the description are omitted to clearly describe the example embodiments, and like reference numerals denote like elements throughout the specification. In this regard, the example embodiments may have different forms and should not be construed as being limited to the descriptions set forth herein. Accordingly, the example embodiments are described below, by referring to the figures, to explain aspects of the present disclosure. As used herein, the term "and/or" includes any and all combinations of one or more of the associated listed items. Expressions such as "at least one of," when preceding a list of elements, modify the entire list of elements and do not modify the individual elements of the list.

Throughout the present disclosure, when it is described that a certain part is "connected" to another part, it should be understood that the certain part may be "directly connected" to another part or "electrically connected" to another part via another element in the middle. Also, when a component "includes" an element, unless there is another opposite description thereto, it should be understood that the component does not exclude another element, but may further include another element.

Hereinafter, the present disclosure will be described in detail with reference to the accompanying drawings.

FIG. 1 is a diagram illustrating a method by which a user sends money by using the user's voice, according to an example embodiment. Referring to FIG. 1, the user may input his or her voice to a device 10 by speaking (e.g., into a microphone) in order to send the money to a recipient. In particular, the user may send the money to a recipient by speaking only by a name of the recipient without speaking or inputting an account number of the recipient.

The device 10 may receive voice input from the user. The device 10 may include a microphone, which receives the user's voice. The device 10 may receive the voice input of the user via the microphone by executing, for example, a voice assistant application such as "S Voice" and controlling the executed application.

The device 10 may recognize the user's voice as indicated at item 1 in FIG. 1. The device 10 may analyze the voice to determine an intention of the user. For example, if the device receives a voice input of the user saying 'send 100 million won to Samsung', the device 10 may determine from the user's voice whether the user intends to send money. In an example embodiment, the device 10 may store in memory the entire user voice input when the user sends money and use the stored information to learn a pattern of the voice input when sending money. The device 10 may determine the intention of the user more accurately through learning. At the beginning of learning, when the user's voice is input, the device 10 may confirm whether to send money. The device 10 may more accurately determine the sending intention of the user through repeated learning.

As an example, the device 10 may compare a stored voice pattern with the pattern of the input voice to determine the intention of the user. The stored voice pattern can include the pattern of the user's voice input when the user intends to send money. The device 10 may determine that the user intends to send money if the stored voice pattern is similar or identical to the pattern of the input voice (e.g., the similarity is equal to or exceeds a threshold similarity). The pattern of the stored voice may be updated or added to through learning.

The device 10 may confirm the name of the recipient or a title and search for the name or the title stored in a contact list. For example, if the user inputs the recipient as 'Samsung', the device 10 may search for 'Samsung' in the contact list. For example, the device 10 may confirm a phone number of 'Samsung' in the contact list.

The device 10 may transmit user information, recipient information, and an amount of money to a bank server 20 as indicated at item 2 in FIG. 1. The user information includes, without limitation, a name of the user, an account number, and the like. The recipient information includes, without limitation, the name of the recipient, a telephone number, and the like. The recipient information may not include an account number of the recipient. The amount of money indicates an amount of money specified in the user's voice input, and is an amount of money that the user will send to the recipient.

The device 10 may be, without limitation, a smart phone, a tablet PC, a PC, a smart TV, a mobile phone, a personal digital assistant (PDA), a laptop, a media player, a micro server, a global positioning system (GPS) device, an e-book terminal, a digital broadcasting terminal, a navigation system, a kiosk, an MP3 player, a digital camera, consumer electronics, and other mobile or non-mobile computing devices. The device 10 may also be a wearable device, such as, without limitation, a watch, glasses, a hair band, a ring, and the like having a communication function and a data processing function. The device 10 may include any kind of device capable of receiving voice input of a user and providing a reply message to the user.

Also, the device 10 may communicate with other devices (not shown) over a network in order to use various types of context information. The network may include a local area network (LAN), a wide area network (WAN), a value added network (VAN), a mobile radio communication network, a satellite communication network, and/or a combination thereof, may be a data communication network in a comprehensive sense for allowing respective network elements to smoothly communicate with each other, and may include wired Internet, wireless Internet, and a mobile wireless communication network. Wireless communication may include, for example, Wi-Fi, Bluetooth, Bluetooth low energy, ZigBee, Wi-Fi Direct (WFD), ultra wideband (UWB), infrared data association (IrDA), Near Field Communication (NFC), and the like, but is not limited thereto.

The bank server 20 may receive the user information and the recipient information as indicated at item 3 in FIG. 1. The bank server 20 may search for an account number that matches the user information. The bank server 20 may search for the account number of the user by using, for example, the name of the user and the telephone number. Also, the bank server 20 may search for an account number assigned (or matched) to unique identification information of the device 10. The device 10 may include unique identification information and the bank server 20 may use the unique identification information of the device 10 to search an account database for the account number of the user of the device 10. The bank server 20 may also search for an account number matching the recipient information. For example, the bank server 20 may search for the account number matching the name and the telephone number of the recipient.

The bank server 20 may generate remittance details as indicated at item 4 in FIG. 1. The bank server 20 may generate the remittance details including, without limitation, the account number of the user, the name of the recipient, the account number of the recipient, and the amount of money. For example, the bank server 20 may generate remittance details 'send 10 thousand won from bank A, 11-1111 (account number), and AAA (user name) to bank B, 22-2222 (account number), and BBB (recipient name)'.

The bank server 20 may transmit the remittance details to the device 10.

The device 10 may display the remittance details. The device 10 may display the remittance details to allow the user to confirm whether the intention of the user's voice input and the remittance details coincide with each other.

The user may approve the remittance details. The user may input, for example, one or more of voice, a fingerprint, an iris scan, a vein image, a face image, and a password if the user wants to send money according to remittance details. The device 10 may perform authentication by determining whether the input voice, fingerprint, iris scan, vein image, face image and/or password matches (or match) personal information of the user. This authentication of remittance details is shown as item 5 in FIG. 1.

The device 10 may transmit an authentication result to the bank server 20 as shown in item 6 in FIG. 1.

The bank server 20 may receive the authentication result and send the money to the recipient according to a received authentication result authenticating the remittance details as shown at item 7 in FIG. 1. The bank server 20 may send the money to the recipient if the user is authenticated as a legitimate user (and optionally send confirmation to the device 10 that the money is sent), and may not send the money and transmit an error message to the device 10 otherwise.

Figure 2:
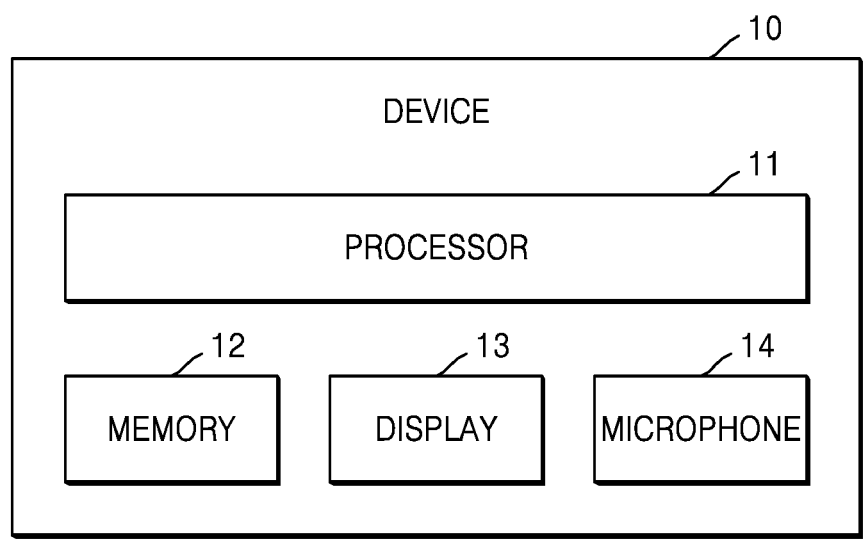
FIG. 2 is a block diagram illustrating a device according to an example embodiment.

FIG. 2 is a block diagram illustrating the device 10 according to an example embodiment. Referring to FIG. 2, the device 10 may include a processor 11, a memory 12, a display 13, and a microphone 14.

The processor (e.g., including processing circuitry such as a CPU and/or dedicated hardware circuitry) 11 may control the overall operation of the device 10 including the memory 12, the display 13, and the microphone 14. The processor 11 may control storing data in and/or reading data to/from the memory 12. The processor 11 may determine an image to be displayed on the display 13 and may control the display 13 to display the image. The processor 11 may control turning the microphone 14 on/off and analyze (e.g., by executing a voice analysis application) a voice input through the microphone 14.

The memory (e.g., ROM, RAM, memory card, nonvolatile, volatile, solid state, hard disk, and the like) 12 may store personal information of a user, biological information, and the like. For example, the memory 12 may store, without limitation, a user's voice, fingerprint, iris scan, vein image, facial image, and/or a password. The memory 12 may store samples of the user's voice and/or prior voice input for analyzing a pattern of the user's voice.

The display (e.g., LCD, OLED, and the like) 13 may display images and reproduce video content under control of the processor 11.

The microphone 14 may receive voice input. The microphone 14 may include circuitry to convert a sound (e.g., voice input) generated in a periphery of the device 10 into an electric signal and output the electric signal to the processor 11.

Figure 3:
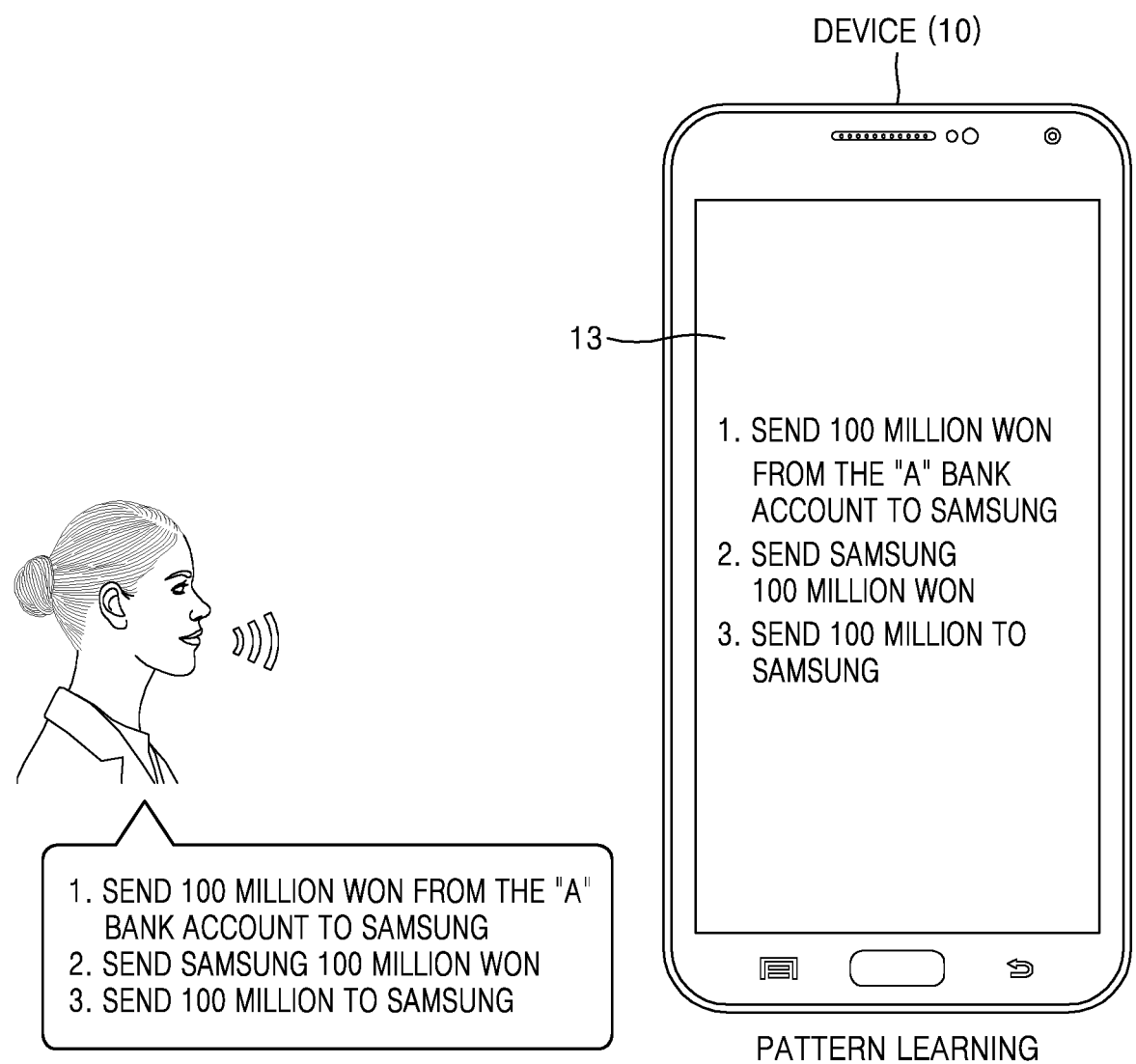
FIG. 3 is a diagram illustrating a device learning a pattern according to an example embodiment.

FIG. 3 is a diagram illustrating the device 10 learning a pattern according to an example embodiment. Referring to FIG. 3, the device 10 may, for example, execute a voice analysis application for analyzing various types of sentences and learn patterns based thereon.

A user may say various types of sentences to send money. For example, in order to send 100 million won from a bank account of the user to Samsung (a recipient), the user may say the following type of sentences:

1. Send 100 million won from the "A" bank account to Samsung
2. Send Samsung 100 million won
3. Send 100 million to Samsung The device 10 may analyze and learn a pattern of the user's voice to identify sentences including the user's intention to send money.

When the user has a plurality of accounts, the device 10 may confirm with the user the account among the plurality of accounts from which to withdraw money. Once an account is designated, the money transfers initiated using device 10 may withdraw money from the designated account from then on, unless there is a different instruction from the user.

Figure 4:
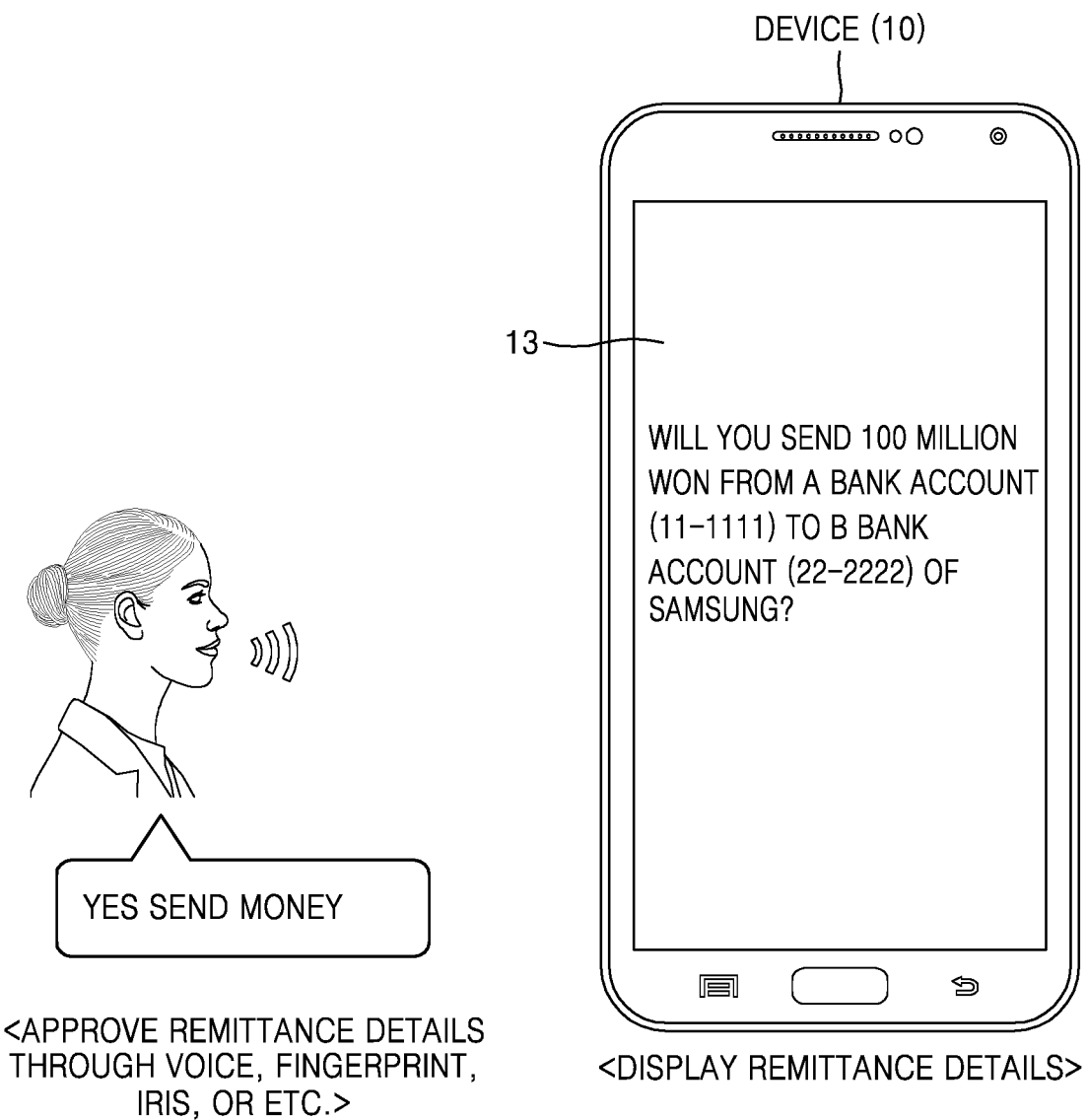
FIG. 4 is a diagram illustrating a method of approving remittance details, according to an example embodiment.

FIG. 4 is a diagram for illustrating a method of approving remittance details, according to an example embodiment. A user may approve the remittance details by using, without limitation, voice input, fingerprint, vein image, face image or iris scan.

The device 10 may receive the remittance details from the bank server 20 and display the remittance details on the display 13 thereof. The remittance details may include, without limitation, an account number of the user, an account number of a recipient, and an amount of money.

The user may approve the remittance details after visually confirming the displayed remittance details. When the user approves the remittance details, the user may use a voice input, fingerprint, vein image, facial image or iris scan. The device 10 may transmit a message indicating that the remittance details are approved to the bank server 20 if an input voice, fingerprint, or iris matches (e.g., has similarity equal to exceeding a predetermined similarity threshold) the user's voice input, fingerprint, vein image, facial image or iris scan as reflected in information stored in memory 12 of the device.

Figure 5:
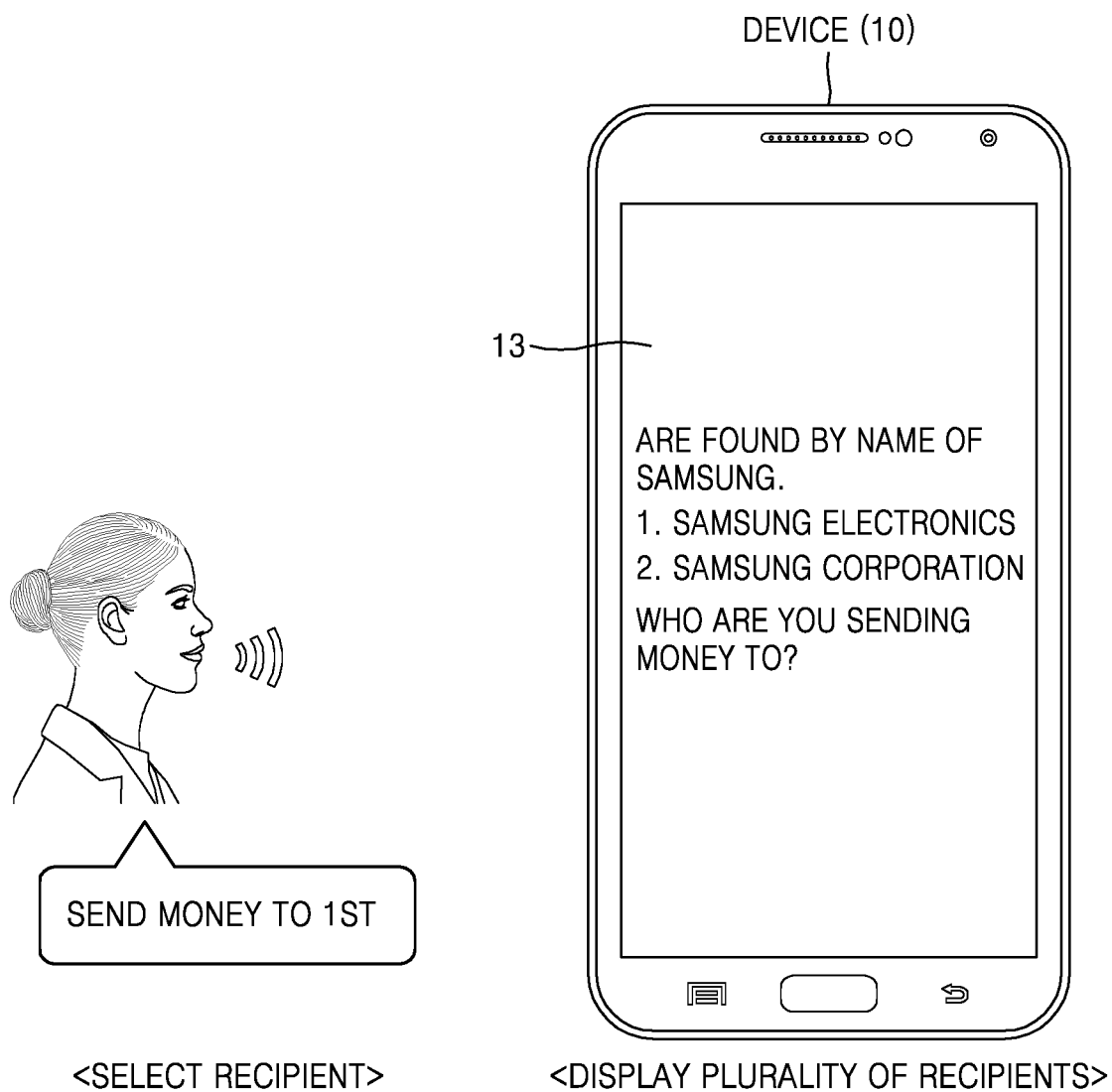
FIG. 5 is a diagram illustrating a method of selecting one of a plurality of recipients, according to an example embodiment.

FIG. 5 is a diagram illustrating a method of selecting one of a plurality of recipients according to an example embodiment. A user may select any one of the plurality of recipients through, for example, voice input.

The device 10 may search a contact list stored in memory 12 (or some other external memory) for a name identified as a recipient. If a plurality of recipients including the identified name are found in the contact list, the device 10 may display names of the plurality of found recipients on display 13. The user may select any one of the displayed names by voice input.

A case in which the following two recipients are found by a name of Samsung is used as an example.
1. Samsung Electronics
2. Samsung Corporation The device 10 may display the two recipients on the display 13. The user may select either a $1^{st}$ recipient or a $2^{nd}$ recipient by voice input. For example, the user may select a recipient by inputting a voice such as 'send money to the $1^{st}$ one' or 'send money to Samsung Electronics'. If display 13 is configured as a touch screen, the user may use a touch input to select a recipient.

Figure 6:
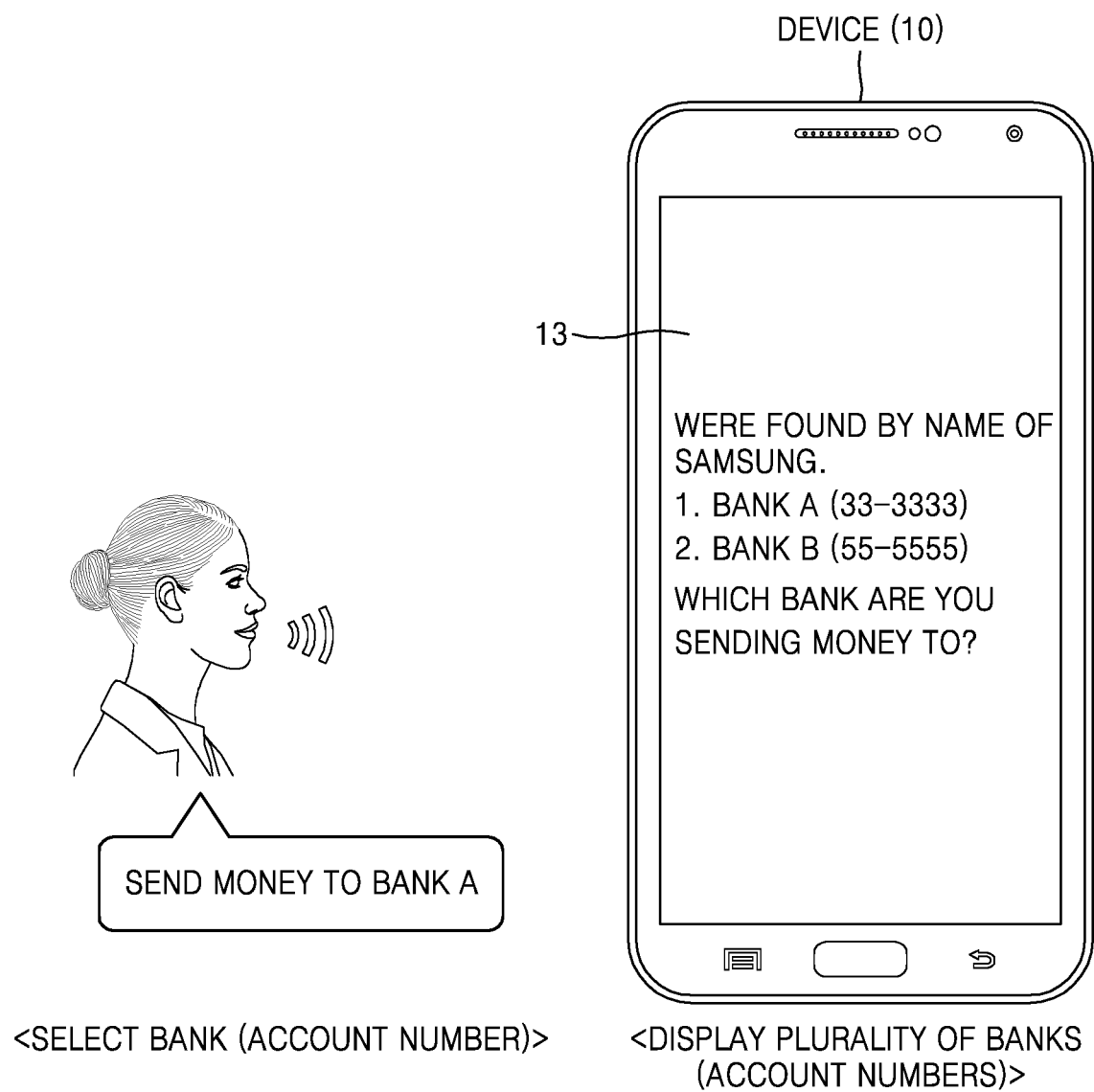
FIG. 6 is a diagram illustrating a method of selecting any of a plurality of banks, according to an example embodiment.

FIG. 6 is a diagram for illustrating a method of selecting any of a plurality of banks according to an example embodiment. A user may select any bank (or an account number) from the plurality of banks (or account numbers) using voice input.

The bank server 20 may transmit the plurality of banks (or account numbers) registered in a name of a recipient when transmitting remittance details to the device 10. For example, if there are a plurality of account numbers registered in the name of the recipient, the device 10 may display the account numbers to the user on display 13 for the user to determine to which account number to send money. As above, the user may select any one of the displayed account numbers by voice or touch input.

The following two account numbers are found under a name of Samsung, for example.
1. Bank A (33-3333)
2. Bank B (55-5555)

The device 10 may display the two account numbers on the display 13. The user may select either a $1^{st}$ or $2^{nd}$ account number by voice input. For example, the user may select a bank or an account number by a voice input providing by speaking, for example, 'Send money to Bank A', 'Send money to the $1^{st}$ one', or 'Send money to the 55-5555 account'.

Figure 7:
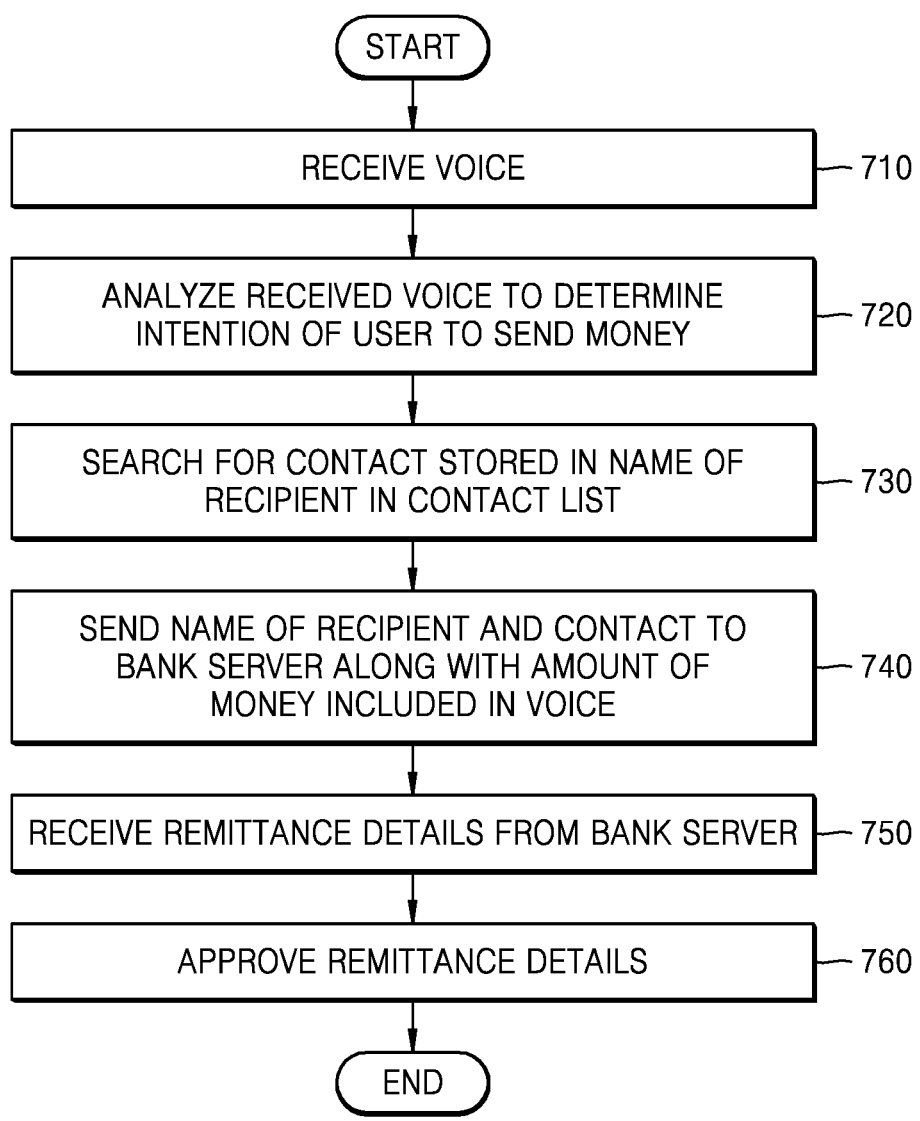
FIG. 7 is a flowchart illustrating a method of sending money by using voice, according to an example embodiment.

FIG. 7 is a flowchart illustrating a method of sending money by using voice input, according to an example embodiment. Referring to FIG. 7, a user may input a name of a recipient and an amount of money by voice input and send money to the recipient.

In operation 710, the device 10 may receive the user's voice input to microphone 14.

In operation 720, the device 10 may analyze the received voice input to determine an intention of the user to send money. As a result of analyzing the received voice, if it is determined that there is no intention to send money, the device 10 does not perform a process for sending money. The voice input may include the name of the recipient and the amount of money, etc. For example, the device 10 may analyze the voice input and determine that the user intends to send money if an instruction, the name, the amount of money, and the like are included in the voice input.

In operation 730, the device 10 may search in a stored contact list for a contact corresponding to the name of the recipient. If a contact corresponding to the name of the recipient is not found, the device 10 may display on the display 13 an information indicating that the contact is missing/not found. The user may input contact information for the recipient by voice input. The device 10 may store the name of the recipient and the corresponding contact in the contact list based on the input voice.

In operation 740, the device 10 may send the name of the recipient and the contact information to the bank server 20 along with the amount of money included in the voice input. The contact information may be searched for by the name of the recipient or entered via voice input by the user.

In operation 750, the device 10 may receive remittance details from the bank server 20. The bank server 20 may search for an account number of the recipient by using the name and the contact information of the recipient and transmit to the device 10 the remittance details including, without limitation, the name of the recipient, the account number, and the amount of money.

In operation 760, the device 10 may approve (authenticate) the remittance details. The device 10 may approve the remittance details by using, without limitation, the user's voice input, fingerprint, iris scan, vein image, facial image, and/or a password. The user may confirm the remittance details and use voice input to the device 10 to approve the remittance details or allow the device 10 recognize the iris, the fingerprint, and the like. Also, when the user wears a wearable device such as a smart watch, the user may perform authentication by using a vein in the back of a user's hand by using the smart watch. For example, the user may manipulate the smart watch to identify the vein in the back of the hand and perform authentication so as to approve the remittance details.

Figure 8:
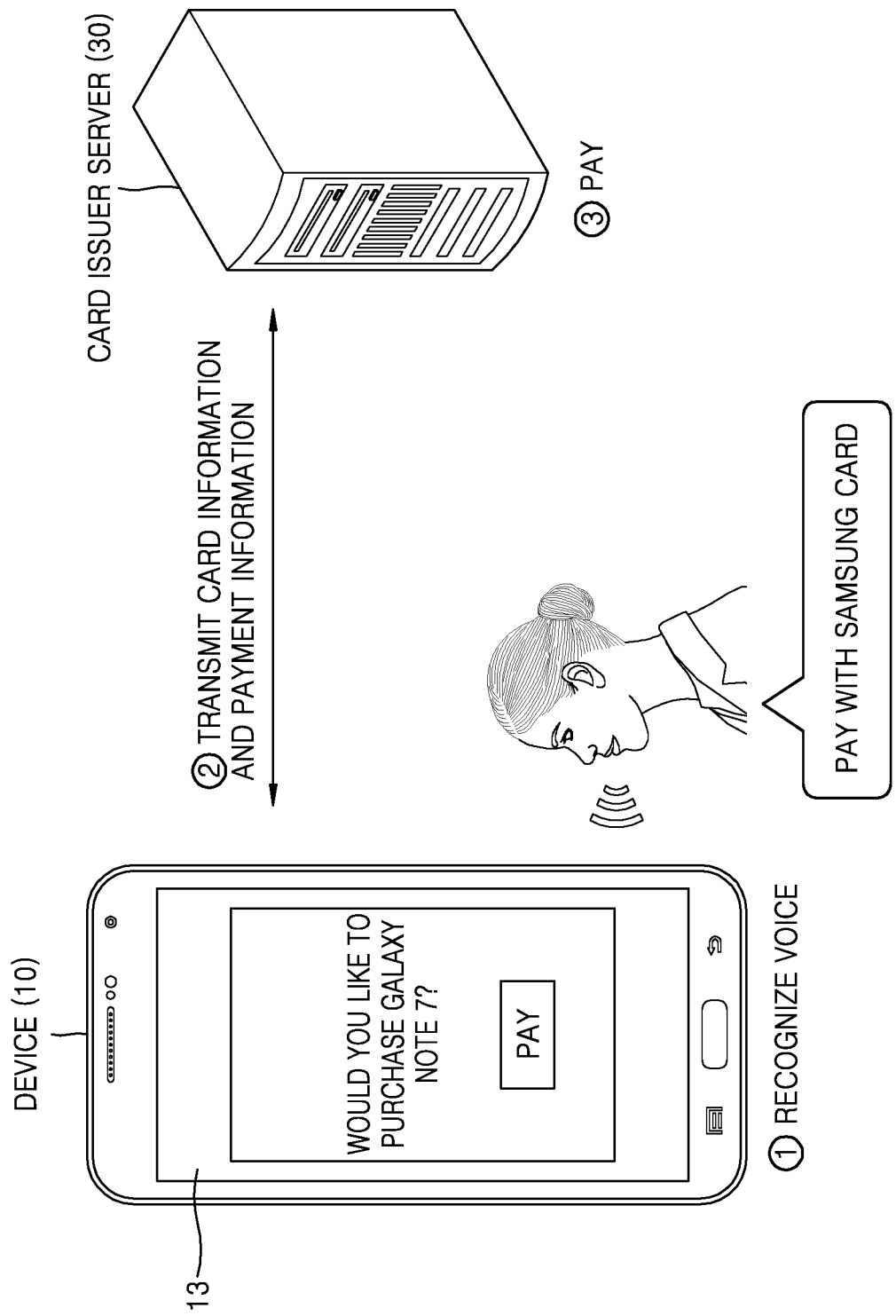
FIG. 8 is a diagram illustrating a method of paying by using voice according to another example embodiment.

FIG. 8 is a diagram illustrating a method for paying using voice input according to another example embodiment. Referring to FIG. 8, a user may pay by using voice input.

The device 10 may display a screen on display 13 for paying for goods or services purchased by the user on the Internet. For example, when the user purchases a Galaxy Note 7, the device 10 may display a message 'Would you like to purchase a Galaxy Note 7?'

After checking payment details, the user may provide voice input to pay. For example, when the user inputs 'pay with Samsung Card', the device 10 may recognize the user's voice as noted at item 1 in FIG. 8. The user may simply input 'Pay', and the device 10 may proceed with payment by using a card previously used by the user to pay.

The device 10 may transmit card information of the user and payment information to a card issuer server 30 as noted by item 2 in FIG. 8. The card information of the user may include a card number, an expiration date of the card, a password, and the like. The payment information may include goods or services to be paid, seller information, and the like.

The card issuer server 30 may confirm the card information and proceed with payment as noted by item 3 in FIG. 8. The card issuer server 30 may transmit a payment completion message to the device 10 when payment is completed. The device 10 may display the payment completion message to notify the user that the payment has been completed normally.

As an example, if the user wears a smart watch and the user pays for goods or services, the smart watch may automatically perform biometric authentication on the user. For example, if the user is wearing the smart watch, the smart watch may capture a vein of a user's wrist and perform vein authentication through a pattern of the captured vein. Therefore, the user may automatically pay through the smart watch without inputting the voice, a password, etc. separately. More specifically, the device 10 may determine whether the user wears the smart watch when the user touches a payment button over the Internet. If the user is wearing the smart watch, the device 10 may send a signal to the smart watch to perform vein authentication. The smart watch may capture the vein of the user under control of the device 10 and transmit a result of performing vein authentication to the device 10. Further, the smart watch may transmit an image of the captured vein to the device 10, and the device 10 may perform vein authentication. Vein authentication may compare a registered vein image (or a vein pattern) with a captured vein image (or the vein pattern). When the user wears the wearable device, the device 10 may proceed with payment without receiving a separate input from the user.

Figure 9:
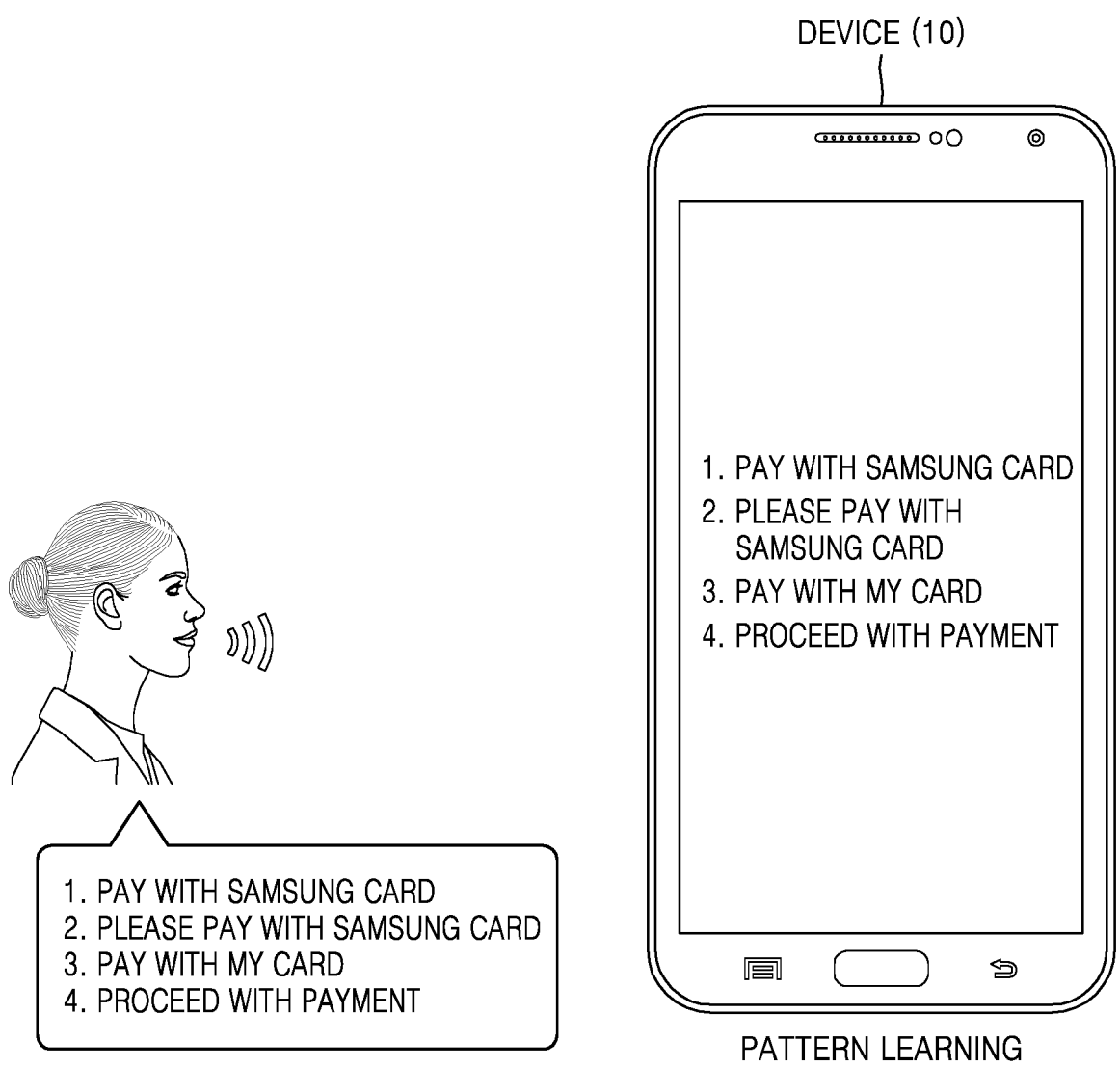
FIG. 9 is a diagram illustrating a device learning a payment pattern according to an example embodiment.

FIG. 9 is a diagram for illustrating the device 10 learning a payment pattern according to an example embodiment. Referring to FIG. 9, the device 10 may analyze payment patterns by analyzing various types of sentences. Learning of the payment pattern may mean to identify and record a type of voice input that a user speaks when paying.

The user may say various types of sentences to pay. For example, the user may say the following types of sentences.
1. Pay with Samsung Card
2. Please pay with Samsung Card
3. Pay with my card
4. Proceed with payment The device 10 may store in memory 12 an expression mainly (most often) said when the user pays and determine whether the user says the same or similar sentence as the stored sentence, and proceed with payment.

The device 10 may register card information of the user at the beginning of learning or request the card information from the user in order to obtain the card information that the user mainly uses. When the card information of the user is registered, even if the user simply says "Pay with my card", the device 10 may proceed with payment by using the previously registered card information of the user.

Figure 10:
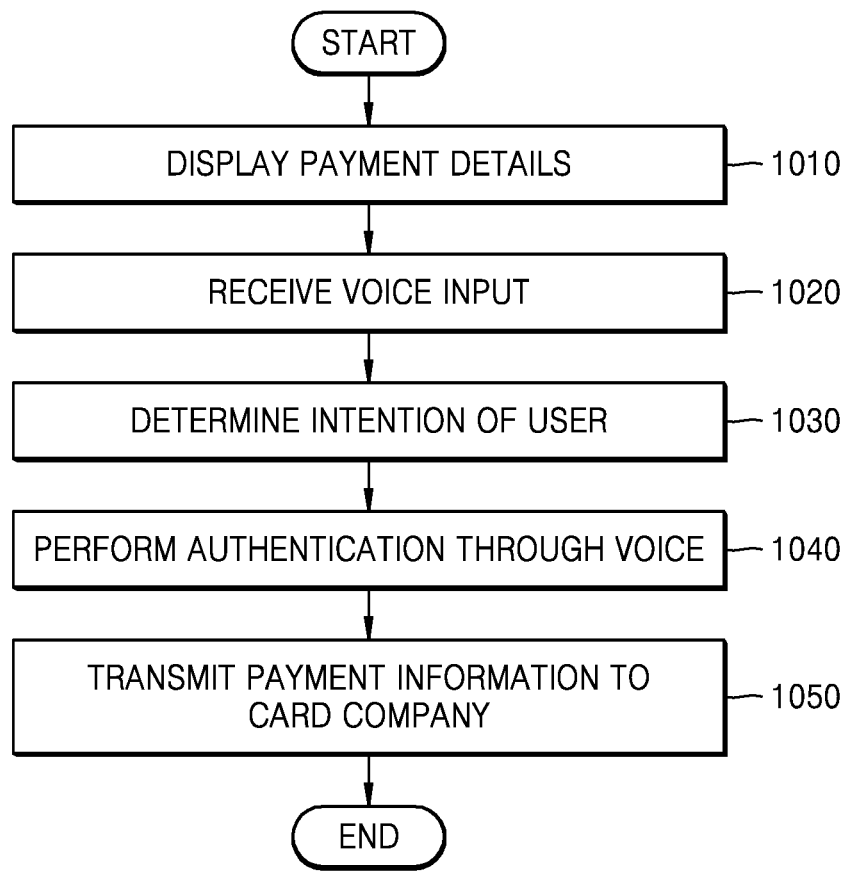
FIG. 10 is a flowchart illustrating a method of paying using voice, according to an example embodiment.

FIG. 10 is a flowchart illustrating a method for paying by voice input according to an example embodiment. Referring to FIG. 10, a user may pay for goods or services by using voice input.

In operation 1010, the device 10 may display payment details on display 13.

In operation 1020, the device 10 may receive the user's voice input via microphone 14. The user may check the payment details, and may express whether or not to pay by providing a voice input. For example, the user may say "Pay" when paying and say "Do not pay" when not paying.

In operation 1030, the device 10 may analyze the received voice input to determine an intention of the user. The device 10 may analyze the voice input and determine whether the user would like to approve the displayed payment details.

In operation 1040, the device 10 may perform user authentication by voice input.

The device 10 may perform user authentication by determining whether the voice input matches the user's voice (e.g., by comparing to a registered voice sample). The device 10 may determine whether the registered voice sample matches the input voice and, if so, proceed with payment. The device 10 may perform user authentication through not only voice, but also fingerprints, irises, veins, faces, or passwords.

In operation 1050, the device 10 may transmit payment information to a card company. If authentication is successful, the device 10 may transmit the payment information and the card information to the card company. The payment information may include goods, seller information, an amount of money, and the like. The card information may include a card number of the user, a password, an expiration date, and the like.

The device 10 may display a payment completion message upon completion of payment.

As described above, when the user purchases goods or services via the Internet, the user may purchase goods or services through voice input.

Figure 11:
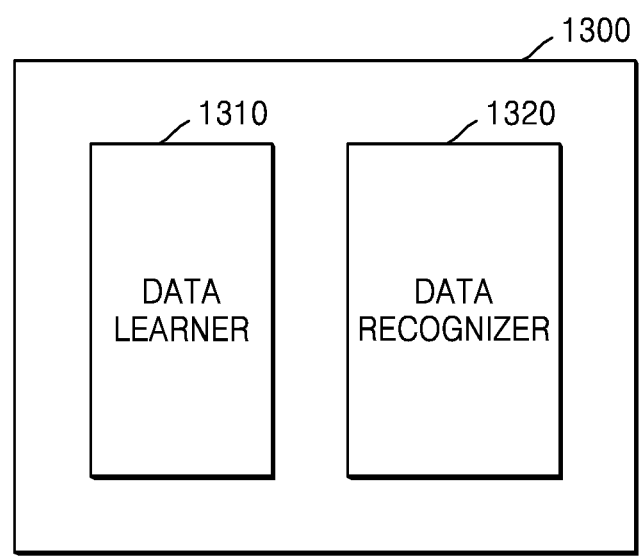
FIG. 11 is a block diagram of a processor according to some example embodiments.

FIG. 11 is a block diagram of a processor 1300 according to some example embodiments.

Referring to FIG. 11, the processor 1300 according to some example embodiments may include a data learner 1310 and a data recognizer 1320.

The data learner 1310 may learn a reference for determining a situation. The data learner 1310 may learn a reference for what data to use to determine a predetermined situation and how to determine the situation by using data. The data learner 1310 may obtain data to be used for learning, and apply the obtained data to a data recognition model that will be described below, thereby learning the reference for determining the situation.

The data learner 1310 may learn a data recognition model by using voice input or a sentence to generate the data recognition model set to estimate an intention of a user. At this time, the voice input or the sentence may include a voice uttered by the user of the device 10 or a sentence with which a user's voice is recognized. Alternatively, the voice or the sentence may include a voice uttered by the third party or a third party's voice.

The data learner 1310 may learn the data recognition model by using a supervised learning method using a voice or a sentence and a learning entity as learning data.

In an example embodiment, the data recognition model may be a model set to estimate an intention of the user to send money. In this case, the learning entity may include, without limitation, at least one of user information, recipient information, remittance amount, and remittance intention. The user information may include, without limitation, identification information (e.g., a name or a nickname) of the user or identification information of an account of the user (e.g., an account bank, an account name, an account nickname or an account number). The recipient information may include, without limitation, identification information (e.g., a name, a nickname or a phone number) or identification information of an account of a recipient (e.g., an account bank, an account name, an account nickname, or an account number). The remittance intention may include whether the user will send money. For example, the remittance intention may include, without limitation, remittance proceedings, remittance reservations, reservation cancellation, remittance holding, or remittance confirmation.

On the other hand, at least one learning entity value may have a value of 'NULL'. In this case, the value 'NULL' may indicate that there is no information about an entity value for the voice input or the sentence used as learning data.

Specifically, if the voice input or the sentence for learning is 'Send 100 million won from A bank account to Samsung', the learning entity is {user information: A bank, recipient information: Samsung, remittance amount: 100 million won, remittance instruction: proceed with remittance}. As another example, if the voice input or the sentence for learning is 'Send 100 million won to Samsung', the learning entity may consist of {user information: NULL, recipient information: Samsung, remittance amount: 100 million won, remittance instruction: proceed with remittance}. As another example, if the voice or the sentence for learning is 'Is it right to have sent 100 million won to Samsung?', the learning entity may consist of {user information: NULL, recipient information: Samsung, remittance amount: 100 million won, remittance instruction: confirm remittance}. As another example, if the voice or the sentence for learning is 'Cancel reservation to send 100 million won to Samsung', the learning entity may consist of {user information: NULL, recipient information: Samsung, remittance amount: 100 million won, remittance instruction: cancel reservation}.

In another example embodiment, the data recognition model may be a model set to estimate a payment intention of the user. In this case, the learning entity may include, without limitation, at least one of a payment card, a payment item, a payment method, and the payment intention. The payment method may include, for example, payment in full or the number of monthly installments. The payment intention may include whether the user will pay. For example, the payment intention may include payment proceeding, payment cancellation, payment holding, a payment method change, or payment confirmation.

Specifically, if the voice input or the sentence for the learning is 'pay in full with Samsung Card', the learning entity may be composed of {payment means: Samsung card, payment item: NULL, payment method: payment in full, payment instruction: proceed with payment}. As another example, if the voice input or the sentence for learning is 'Pay in 10 monthly installments', the learning entity may be composed of {payment means: NULL, payment item: NULL, settlement method: 10 monthly installments, payment instruction: proceed with payment}. As another example, if the voice input or the sentence for learning is 'Cancel a previous payment', the learning entity may be composed of {payment means: NULL, payment item: NULL, payment method: NULL, payment instruction: cancel payment}.

The data recognition model set to determine the remittance intention of the user and the data recognition model set to determine the payment intention of the user may be the same recognition model or different recognition models. Alternatively, each of the data recognition models may include a plurality of data recognition models. For example, the intention of the user may be determined by using the plurality of data recognition models customized for each environment considering a use environment (for example, a use time or a place of use) of the user.

The data recognizer 1320 may determine a situation based on data. The data recognizer 1320 may recognize the situation from predetermined data by using the learned data recognition model. The data recognizer 1320 may determine a predetermined situation based on predetermined data by obtaining the predetermined data according to a predetermined reference by learning and using the data recognition model by using the obtained data as an input value. Further, a resultant value output by the data recognition model by using the obtained data as the input value may be used to update the data recognition model.

The data recognizer 1320 may estimate an intention of the user by applying the user's voice input or a sentence with which the user's voice is recognized to the data recognition model. For example, the data recognizer 1320 may apply the user's voice input or the sentence with which the user's voice is recognized to the data recognition model to obtain a recognition entity and provide the recognition entity to a processor of a device (e.g., the processor 11 of the device 10 of FIG. 2). The processor 11 may determine the intention of the user by using the obtained recognition entity.

In an example embodiment, the data recognition model may be a model set to estimate an intention of the user to send money. In this case, the data recognizer 1320 may estimate the intention of the user to send money by applying the user's voice input or the sentence with which the user's voice is recognized to the data recognition model. For example, the data recognizer 1320 may obtain a recognition entity from the user's voice input or the sentence with which the user's voice is recognized. The recognition entity may include, for example, at least one of user information, recipient information, a remittance amount, and a remittance instruction. The data recognizer 1320 may provide the obtained recognition entity to the processor 11. The processor 11 (or a dialog management module of the processor 11) may determine the intention of the user based on the recognition entity.

If it is determined that the intention of the user includes no intention to send money based on the recognition entity, the processor 11 may not perform a process for sending money. On the other hand, if it is determined based on the recognition entity that the intention of the user is to send money, the processor 11 may perform the process for sending money.

At this time, if at least one of the values of the recognition entity is 'NULL', the processor 11 may determine a value corresponding to a value 'NULL' using history information of the user or preset information. For example, the processor 11 may determine a value corresponding to the value 'NULL' by referring to a recent remittance history. Alternatively, the processor 11 may determine a value corresponding to the value 'NULL' by referring to information (for example, an account number, an account bank, etc.) preset by the user in a preference setting.

If at least one of the values of the recognition entity is 'NULL', the processor 11 may request a value corresponding to the value 'NULL' from the user. For example, the processor 11 may control display 13 to display a sentence indicating that there is no information about at least one of the user information, the recipient information, the remittance amount, or the remittance instruction. When the user inputs at least one piece of the above information by voice or other input (e.g., by virtual keyboard displayed on display 13), the processor 11 may perform a process for sending money by using the recognition entity value obtained from the data recognizer 1320 and user input information.

In another example embodiment, the data recognition model may be a model set to estimate a payment intention of the user. In this case, the data recognizer 1320 may estimate the payment intention of the user by applying the user's voice input or the sentence with which the user's voice is recognized to the data recognition model. For example, the data recognizer 1320 may obtain a recognition entity from the user's voice input or the sentence with which the user's voice is recognized. The recognition entity may include, for example, at least one of payment means, a payment item, a payment method and a payment instruction. The data recognizer 1320 may provide the obtained recognition entity to the processor 11. The processor 11 (or a dialog management module of the processor 11) may determine the intention of the user based on the recognition entity.

If it is determined based on the recognition entity that the intention of the user is to not pay, the processor 11 may not perform a process for payment. On the other hand, if it is determined based on the recognition entity that the intention of the user is to pay, the processor 11 may perform the process for payment.

On the other hand, if at least one of the values of the recognition entity is 'NULL', the processor 11 may determine a value corresponding to the value 'NULL' using history information of the user or preset information. Alternatively, the processor 11 may request the user to input a value corresponding to the value 'NULL'.

At least one of the data learner 1310 and the data recognizer 1320 may be manufactured as at least one hardware chip and mounted on an electronic device. For example, at least one of the data learner 1310 and the data recognizer 1320 may be manufactured as a dedicated hardware chip for artificial intelligence (AI) or may be manufactured as a part of a conventional general purpose processor (e.g. a CPU or an application processor) or a graphics processor (e.g., a GPU) and may be mounted on various electronic devices as described above. In this case, the dedicated hardware chip for AI may be a dedicated processor specialized for probability calculation, and have a higher parallel processing performance than the conventional general purpose processor, thereby quickly processing arithmetic operations in an AI field such as machine learning.

In this case, the data learner 1310 and the data recognizer 1320 may be mounted on one electronic device or on separate electronic devices. For example, one of the data learner 1310 and the data recognizer 1320 may be included in the electronic device, and the other may be included in a server. The data learner 1310 and the data recognizer 1320 may provide model information constructed by the data learner 1310 to the data recognizer 1320 via wired or wireless communication. Data input to the data recognizer 1320 may be provided to the data learner 1310 as additional learning data.

Meanwhile, at least one of the data learner 1310 and the data recognizer 1320 may be implemented as a software module. When at least one of the data learner 1310 and the data recognizer 1320 is implemented as a software module (or a program module including an instruction), the software module may be stored in non-transitory computer-readable media. Further, in this case, the at least one software module may be provided by an operating system (OS) or by a predetermined application. Alternatively, some of the at least one software module may be provided by the OS, and the others may be provided by the predetermined application.

Figure 12:
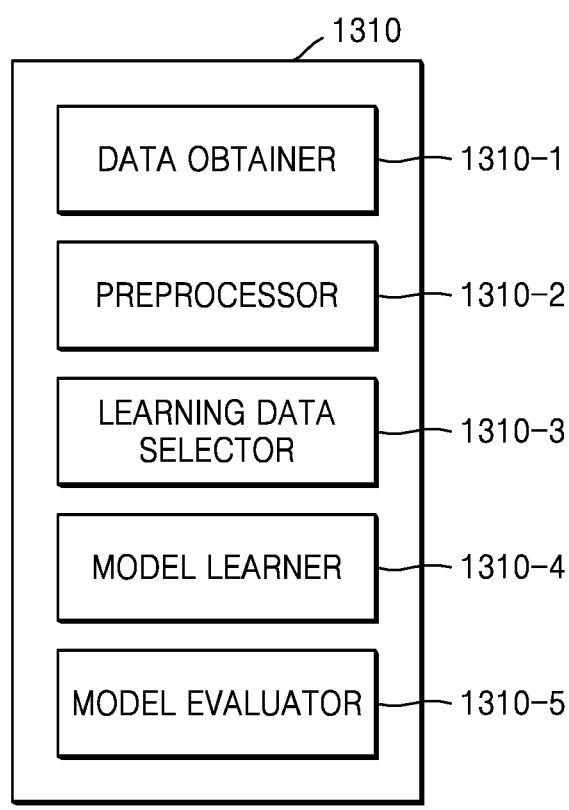
FIG. 12 is a block diagram of a data learner according to some example embodiments.

FIG. 12 is a block diagram of the data learner 1310 according to some example embodiments.

Referring to FIG. 12, the data learner 1310 according to some example embodiments may include a data obtainer 1310-1, a preprocessor 1310-2, a learning data selector 1310-3, a model learner 1310-4, and a model evaluator 1310-5. In some example embodiments, the data learner 1310 may indispensably include the data obtainer 1310-1 and the model learner 1310-4, and may selectively include at least one of or may not include all of the preprocessor 1310-2, the learning data selector 1310-3, and the model evaluator 1310-5.

The data obtainer 1310-1 may obtain data necessary for learning for determining a situation.

For example, the data obtainer 1310-1 may obtain voice data, image data, text data, biometric signal data, or the like. Specifically, the data obtainer 1310-1 may obtain a voice input or a sentence for sending money or payment. Alternatively, the data obtainer 1310-1 may obtain voice data or text data including the voice or the sentence for sending money or payment.

The data obtainer 1310-1 may receive data through an input device (e.g., a microphone, a camera, a sensor, keyboard, or the like) of an electronic device. Alternatively, the data obtainer 1310-1 may obtain data via an external device (e.g., a server) that communicates with a device.

The preprocessor 1310-2 may preprocess the obtained data so that the data obtained for learning for determining the situation may be used. The preprocessor 1310-2 may process the obtained data in a predetermined format so that the model learner 1310-4, which will be described below, may use the obtained data for learning for determining the situation. For example, the preprocessor 1310-2 may extract learning entity values from the voice data according to the predetermined format. For example, when the predetermined format is composed of {user information, recipient information, remittance amount, and remittance instruction}, or when the predetermined format is composed of {payment means, payment item, payment method, payment instruction}, the preprocessor 1310-2 may extract the learning entity value from the voice data according to the format. At this time, if the learning entity value is not extracted, the preprocessor 1310-2 may cause display a specific entity value to be 'NULL'.

The learning data selector 1310-3 may select data required for learning from the preprocessed data. The selected data may be provided to the model learner 1310-4. In this case, the data obtained by the data obtainer 1310-1 or the data processed by the preprocessor 1310-2 may be provided to the model learner 1310-4 as learning data. The learning data selector 1310-3 may select data required for learning from the preprocessed data according to a predetermined reference for determining the situation. The predetermined reference may be determined, for example, considering at least one of attributes of the data, a generation time of the data, a creator of the data, reliability of the data, a target of the data, a generation region of the data, and size of the data. Alternatively, the learning data selector 1310-3 may select the data according to the predetermined reference by learning by using the model learner 1310-4, which will be described below.

The model learner 1310-4 may learn a reference on how to determine the situation based on the learning data. Also, the model learner 1310-4 may learn a reference on which learning data should be used for determining the situation. For example, the model learner 1310-4 may learn a determination model according to a supervised learning method or an unsupervised learning method to generate a data recognition model for predicting, determining, or estimating. The data recognition model may be, for example, a model set for estimating a remittance intention of a user or a model set for estimating a payment intention of the user.

Further, the model learner 1310-4 may learn the data recognition model used for determining the situation by using the learning data. The data recognition model may be a pre-built model. For example, the data recognition model may be a pre-built model by receiving basic learning data (e.g., sample data, etc.).

The data recognition model may be constructed considering an application field of the recognition model, a purpose of learning, or the computer performance of the device. The data recognition model may be, for example, a model based on a neural network. The data recognition model may be designed to simulate a human brain structure on a computer. The data recognition model may include a plurality of network nodes having weights to simulate a neuron of a human neural network. The plurality of network nodes may establish a connection relationship to simulate a synaptic activity of a neuron sending and receiving signals via synapse. The data recognition model may include, for example, a neural network model or a deep learning model developed from the neural network model. In the deep learning model, the plurality of network nodes may be located at different depths (or layers) and may exchange data according to a convolution connection relationship. For example, a model such as a Deep Neural Network (DNN), a Recurrent Neural Network (RNN), or a Bidirectional Recurrent Deep Neural Network (BRDNN) may be used as a data recognition model, but the present disclosure is not limited thereto.

According to various example embodiments, when there are a plurality of data recognition models that are built in advance, the model learner 1310-4 may determine a data recognition model having a high relation between input learning data and basic learning data as a data recognition model to learn. In this case, the basic learning data may be pre-classified according to data types, and the data recognition model may be pre-built for each data type. For example, the basic learning data may be pre-classified by various references such as a region where learning data is generated, a time at which the learning data is generated, a size of the learning data, a genre of the learning data, a creator of the learning data, a genre of an object in the learning data, etc.

Also, the model learner 1310-4 may learn the data recognition model by using, for example, a learning algorithm including an error back-propagation method or a gradient descent method.

Also, the model learner 1310-4 may learn the data recognition model through supervised learning by, for example, using the learning data as an input value. Also, the model learner 1310-4 may learn the data recognition model through unsupervised learning to find a reference for determining the situation by, for example, learning a type of data necessary for determining the situation for itself. Also, the model learner 1310-4 may learn the data recognition model through reinforcement learning, for example by using feedback on whether a result of determination of the situation based on the learning is correct.

The learning data may include a user's voice input or a third party's voice input, a sentence via which the user's voice or the third party's voice is recognized, a sentence entered by the user or the third party, and the like. Also, the learning data may include a learning entity associated with the voice input or the sentence. Various examples of learning entities are described in detail with reference to FIG. 11, and thus redundant descriptions thereof are omitted.

Further, when the data recognition model is learned, the model learner 1310-4 may store the learned data recognition model. In this case, the model learner 1310-4 may store the learned data recognition model in a memory of an electronic device (for example, memory 12 of the above-described device 10) including the data recognizer 1320. Alternatively, the model learner 1310-4 may store the learned data recognition model in a memory of an electronic device including the data recognizer 1320 that will be described below. Alternatively, the model learner 1310-4 may store the learned data recognition model in a memory of a server connected to the electronic device (for example, the above-described device 10) via a wired or wireless network.

In this case, the memory in which the learned data recognition model is stored may also store, for example, instructions or data associated with at least one other component of the electronic device. The memory may also store software and/or a program. The program may include, for example, a kernel, middleware, an application programming interface (API), and/or an application program (or "application").

The model evaluator 1310-5 may input evaluation data to the data recognition model, and if a recognition result output from the evaluation data does not satisfy a predetermined reference, the model evaluator 1310-5 may allow the model learner 1310-4 to learn again. In this case, the evaluation data may be predetermined data for evaluating the data recognition model.

For example, when the number or a ratio of the evaluation data whose recognition result is not correct exceeds a preset threshold value in the recognition result of the learned data recognition model for the evaluation data, the model evaluator 1310-5 may evaluate the learned data recognition model as not satisfying the predetermined reference. For example, when the predetermined reference is defined as a ratio of 2%, when the learned data recognition model outputs an incorrect recognition result for evaluation data exceeding 20 pieces of evaluation data among a total of 1000 pieces of the evaluation data, the model evaluator 1310-5 may evaluate that the learned data recognition model is not suitable.

On the other hand, when there are a plurality of learned data recognition models, the model evaluator 1310-5 may evaluate whether each of the learned data recognition models satisfies a predetermined reference and may determine a model satisfying the predetermined reference as a final data recognition model. In this case, when there are a plurality of models satisfying the predetermined reference, the model evaluator 1310-5 may determine any one model previously set in descending order of an evaluation score or a predetermined number of models as the final data recognition model.

Meanwhile, at least one of the data obtainer 1310-1, the preprocessor 1310-2, the learning data selector 1310-3, the model learner 1310-4, and the model evaluator 1310-5 included in the data learner 1310 may be manufactured in at least one hardware chip and mounted on an electronic device. For example, at least one of the data obtainer 1310-1, the preprocessor 1310-2, the learning data selector 1310-3, the model learner 1310-4, and the model evaluator 1310-5 may be manufactured as a dedicated hardware chip for AI or may be manufactured as a part of a conventional general purpose processor (e.g. a CPU or an application processor) or a graphics processor (e.g., a GPU) and may be mounted on various electronic devices as described above.

Also, the data obtainer 1310-1, the preprocessor 1310-2, the learning data selector 1310-3, the model learner 1310-4, and the model evaluator 1310-5 may be mounted on one electronic device or may be mounted on separate electronic devices. For example, some of the data obtainer 1310-1, the preprocessor 1310-2, the learning data selector 1310-3, the model learner 1310-4, and the model evaluator 1310-5 may be included in the electronic device, and the others may be included in a server.

Also, at least one of the data obtainer 1310-1, the preprocessor 1310-2, the learning data selector 1310-3, the model learner 1310-4, and the model evaluator 1310-5 may be implemented as a software module. When at least one of the data obtainer 1310-1, the preprocessor 1310-2, the learning data selector 1310-3, the model learner 1310-4, and the model evaluator 1310-5 is implemented as a software module (or a program module including an instruction), the software module may be stored in non-transitory computer-readable media. Further, in this case, the at least one software module may be provided by an operating system (OS) or by a predetermined application. Alternatively, some of the at least one software module may be provided by the OS, and the others may be provided by the predetermined application.

Figure 13:
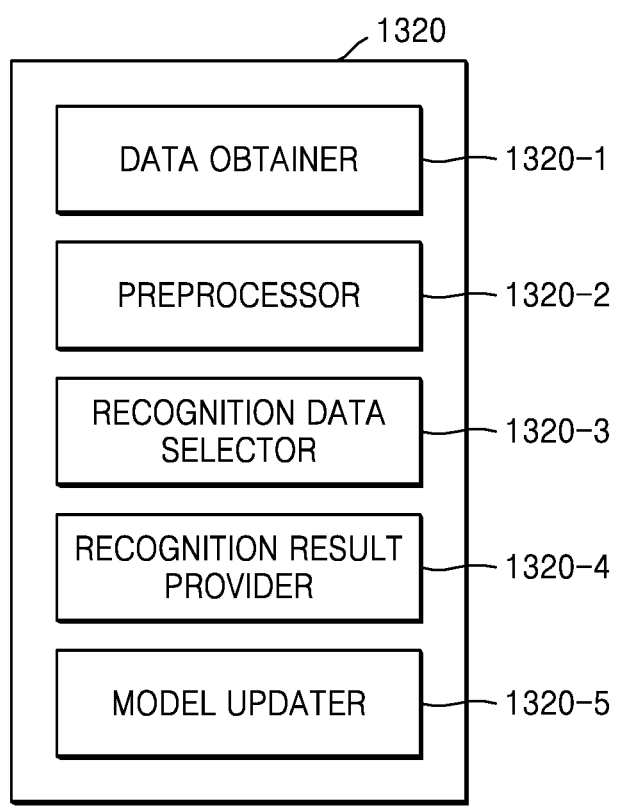
FIG. 13 is a block diagram of a data recognizer according to some example embodiments.

FIG. 13 is a block diagram of the data recognizer 1320 according to some example embodiments.

Referring to FIG. 13, the data recognizer 1320 according to some example embodiments may include a data obtainer 1320-1, a preprocessor 1320-2, a recognition data selector 1320-3, a recognition result provider 1320-4 and a model updater 1320-5. In some example embodiments, the data recognizer 1320 may indispensably include the data obtainer 1320-1 and the recognition result provider 1320-4, and may selectively include at least one of the preprocessor 1320-2, the recognition data selector 1320-2, and the model updater 1320-5.

The data obtainer 1320-1 may obtain data necessary for determining a situation. For example, the data obtainer 1320-1 may obtain a user's voice input or a sentence with which the user's voice is recognized. Specifically, the data obtainer 1320-1 may obtain the user's voice input or the sentence for performing remittance or payment. Alternatively, the data obtainer 1320-1 may obtain voice data or text data including the user's voice or the sentence for performing remittance or payment.

The preprocessor 1320-2 may preprocess the obtained data so that the data obtained for determining the situation may be used. The preprocessor 1320-2 may process the obtained data into a predetermined format so that the recognition result provider 1320-4, which will be described below, may use the obtained data for determining the situation. For example, the preprocessor 1320-2 may extract learning entity values from the voice data according to the predetermined format. For example, the preprocessor 1320-2 may extract the learning entity values according to the format of {user information, recipient information, remittance amount, and remittance instruction} or {payment means, payment item, payment method, payment instruction}.

The recognition data selector 1320-3 may select data necessary for the determination of the situation from the preprocessed data. The selected data may be provided to the recognition result provider 1320-4. The recognition data selector 1320-3 may select a part or a whole of the preprocessed data according to a preset reference for determining the situation. The predetermined reference may be determined, for example, considering at least one of attributes of the data, a generation time of the data, a creator of the data, a reliability of the data, a target of the data, a generation region of the data and a size of the data. Alternatively, the recognition data selector 1320-3 may select data according to the predetermined reference by learning by the model learner 1310-4.

The recognition result provider 1320-4 may apply the selected data to a data recognition model to determine the situation. The recognition result provider 1320-4 may provide a recognition result according to a data recognition purpose. The recognition result provider 1320-4 may apply the selected data to the data recognition model by using the data selected by the recognition data selector 1320-3 as an input value. Also, the recognition result may be determined by the data recognition model.

For example, when the data recognition model is a model set for estimating a remittance intention of the user, the recognition result provider 1320-4 may apply the user's voice input saying the sentence via which the user's voice input is recognized to the data recognition model to estimate, infer or predict the remittance intention of the user. Alternatively, when the data recognition model is a model set for estimating a payment intention of the user, the recognition result provider 1320-4 may apply the user's voice input or the sentence with which the user's voice input is recognized to the data recognition model to estimate (or infer or predict) the payment intention of the user.

The recognition result provider 1320-4 may obtain a recognition entity as a result of estimating the intention of the user. The recognition result provider 1320-4 may provide the obtained recognition entity to a processor (e.g., the processor 11 of the device 10 of FIG. 2). The processor may determine the intention of the user based on the recognition entity and proceed with a process for sending money or payment.

The model updater 1320-5 may update the data recognition model based on an evaluation of the recognition result provided by the recognition result provider 1320-4. For example, the model updater 1320-5 may provide the model learner 1310-4 with the recognition result provided by the recognition result provider 1320-4 so that the model learner 1310-4 may update the data recognition model.

Alternatively, the model updater 1320-5 may receive an evaluation (or feedback) on the recognition result from a processor (for example, the processor 11 of the device 10 of FIG. 2). For example, the device 10 may display remittance details according to the remittance intention of the user by applying a voice input by the user to the data recognition model.

The user may approve the remittance details or refuse to approve the remittance details. For example, if the user approves the remittance details, the user may enter voice, fingerprints, an iris scan, a vein image, a face image or a password. On the other hand, when the user refuses to approve the remittance details, the user may select a cancel button, enter a voice requesting cancellation, or not perform any input for a predetermined period of time.

In this case, user feedback according to an approval or a rejection of the user may be provided to the model updater 1320-5 as an evaluation of the recognition result. That is, the user feedback may include information indicating that a determination result of the data recognizer 1320 is false or information indicating that the determination result is true. The model updater 1320-5 may update a determination model by using the obtained user feedback.

Meanwhile, at least one of the data obtainer 1320-1, the preprocessor 1320-2, the recognition data selector 1320-3, the recognition result provider 1320-4, and the model updater 1320-5 in the data recognizer 1320 may be manufactured in at least one hardware chip and mounted on an electronic device. For example, at least one of the data obtainer 1320-1, the preprocessor 1320-2, the recognition data selector 1320-3, the recognition result provider 1320-4, and the model updater 1320-5 may be manufactured as a dedicated hardware chip for AI or may be manufactured as a part of a conventional general purpose processor (e.g. a CPU or an application processor) or a graphics processor (e.g., a GPU) and may be mounted on various electronic devices as described above.

Also, at least one of the data obtainer 1320-1, the preprocessor 1320-2, the recognition data selector 1320-3, the recognition result provider 1320-4, and the model updater 1320-5 may be mounted on one electronic device or may be mounted on separate electronic devices. For example, some of the data obtainer 1320-1, the preprocessor 1320-2, the recognition data selector 1320-3, the recognition result provider 1320-4, and the model updater 1320-5 may be included in the electronic device, and the others may be included in a server.

Also, at least one of the data obtainer 1320-1, the preprocessor 1320-2, the recognition data selector 1320-3, the recognition result provider 1320-4, and the model updater 1320-5 may be implemented as a software module. When at least one of the data obtainer 1320-1, the preprocessor 1320-2, the recognition data selector 1320-3, the recognition result provider 1320-4, and the model updater 1320-5 is implemented as the software module (or a program module including an instruction), the software module may be stored in non-transitory computer-readable media. Further, in this case, the at least one software module may be provided by an OS or by a predetermined application. Alternatively, some of the at least one software module may be provided by the OS, and the others may be provided by the predetermined application.

Figure 14:
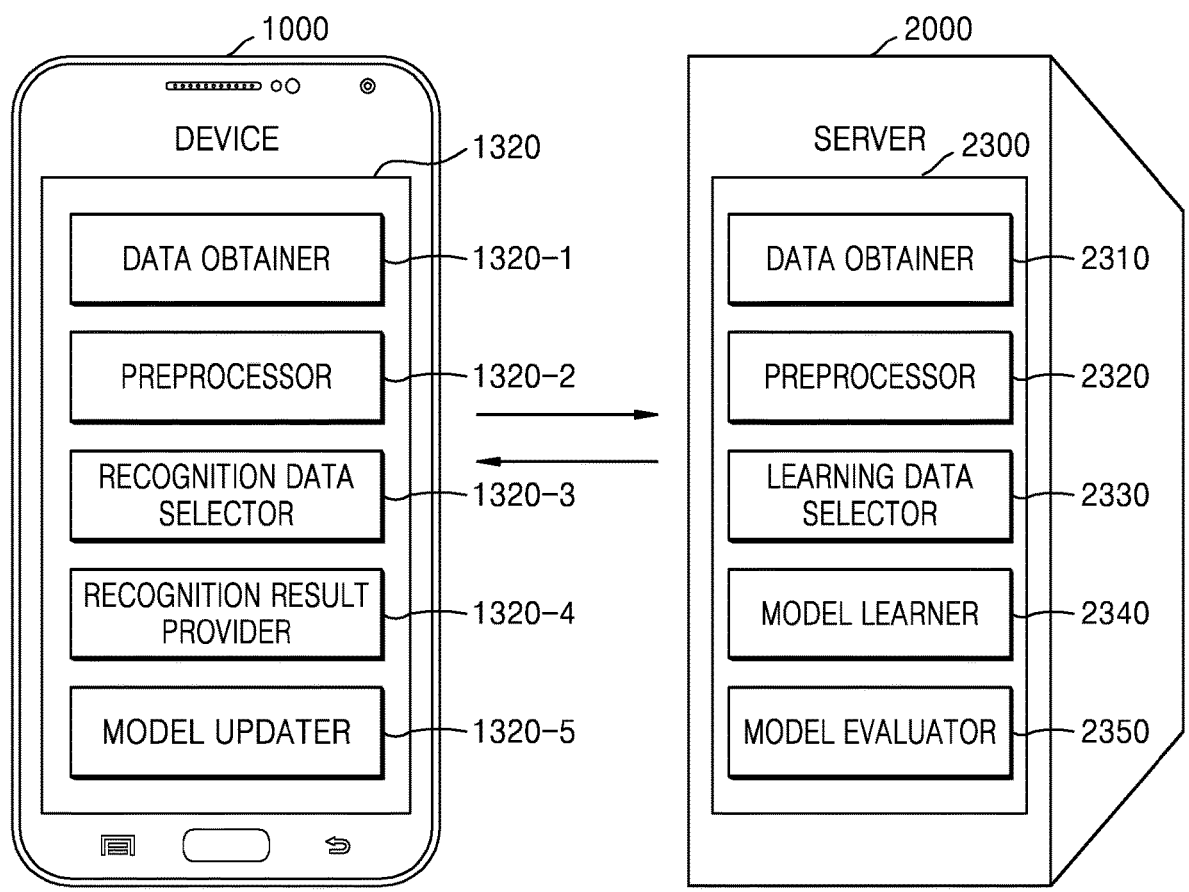
FIG. 14 is a diagram illustrating an example of learning and recognizing data by interaction between a device and a server according to some example embodiments.

FIG. 14 is a diagram illustrating an example of learning and recognizing data by interaction between a device 1000 and a server 2000 according to some non-limiting embodiments.

The device 1000 may correspond to, for example, the device 10 of FIG. 2. The data obtainer 1320-1, the preprocessor 1320-2, the recognition data selector 1320-3, the recognition result provider 1320-4 and the model updater 1320-5 of the data recognizer 1320 of the device 1000 may respectively correspond to the data obtainer 1320-1, the preprocessor 1320-2, the recognition data selector 1320-3, the recognition result provider 1320-4, and the model updater 1320-5 of the data recognizer 13320 of FIG. 13. Also, the data obtainer 2310, the preprocessor 2320, the learning data selector 2330, the model learner 2340, and the model evaluator 2350 of the data learner 2300 of the server 2000 respectively correspond to the data obtainer 1310-1, the preprocessor 1310-2, the learning data selector 1310-3, the model learner 1310-4, and the model evaluator 1310-5.

The device 1000 may interact with the server 2000 through short-range or long-distance communication. Connecting of the device 1000 and the server 2000 to each other means that the device 1000 and the server 2000 are directly connected to each other or connected to each other through another component (e.g., at least one of an access point (AP), a hub, a relay device, a base station, a router, and a gateway as a third component).

Referring to FIG. 14, the server 2000 may learn a reference for determining a situation, and the device 1000 may determine the situation based on a learning result by the server 2000.

In this case, the model learner 2340 of the server 2000 may perform a function of the data learner 1310 shown in FIG. 12. The model learner 2340 of the server 2000 may learn what data to use to determine a predetermined situation and how to determine the situation by using data. The model learner 2340 may obtain data to be used for learning, and apply the obtained data to a data recognition model to learn the reference for determining the situation. For example, the model learner 2340 may learn the data recognition model by using a voice input or a sentence to generate a data recognition model set to estimate an intention of a user. The generated data recognition model may be, for example, a model set for estimating at least one of a remittance intention of the user and a payment intention.

The recognition result provider 1320-4 of the device 1000 may determine the situation by applying the data selected by the recognition data selector 1320-3 to the data recognition model generated by the server 2000. For example, the recognition result provider 1320-4 may transmit the data selected by the recognition data selector 1320-3 to the server 2000. The server 2000 may apply the data selected by the recognition data selector 1320-3 to the data recognition model to request determination of the situation. Also, the recognition result provider 1320-4 may receive from the server 2000 information about the situation determined by the server 2000. For example, when the selected data includes a user's voice input or a sentence with which the user's voice is recognized, the server 2000 may apply the selected data to the data recognition model set to estimate an intention of the user to obtain a recognition entity including the intention of the user. The server 2000 may provide the obtained entity to the recognition result provider 1320-4 as information on the determined situation.

As another example, the recognition result provider 1320-4 of the device 1000 may receive the recognition model generated by the server 2000 from the server 2000 and determine the situation by using the received recognition model. In this case, the recognition result provider 1320-4 of the device 1000 may apply the data selected by the recognition data selector 1320-3 to the data recognition model received from the server 2000 to determine the situation. For example, when the selected data includes the user's voice input or the sentence with which the user's voice is recognized, the recognition result provider 1320-4 of the device 1000 may apply the selected data to a data recognition model set to estimate an intention of the user received from the server 2000 to obtain a recognition entity including the intention of the user. The device 1000 may then provide the obtained entity to a processor (e.g., the processor 11 of FIG. 2) as information about the determined situation.

The processor 11 may determine a remittance intention of the user or a payment intention based on the recognition entity, and may perform a process for sending money or payment.

The device 10 according to an example embodiment may send money to a recipient by only a voice input.

The device 10 according to an example embodiment may send money to the recipient by transmitting a name of the recipient, a contact, and an amount of money to the bank server 20 without having to transmit an account number of the recipient.

The device 10 according to an example embodiment may pay by only a voice input.

Figure 15:
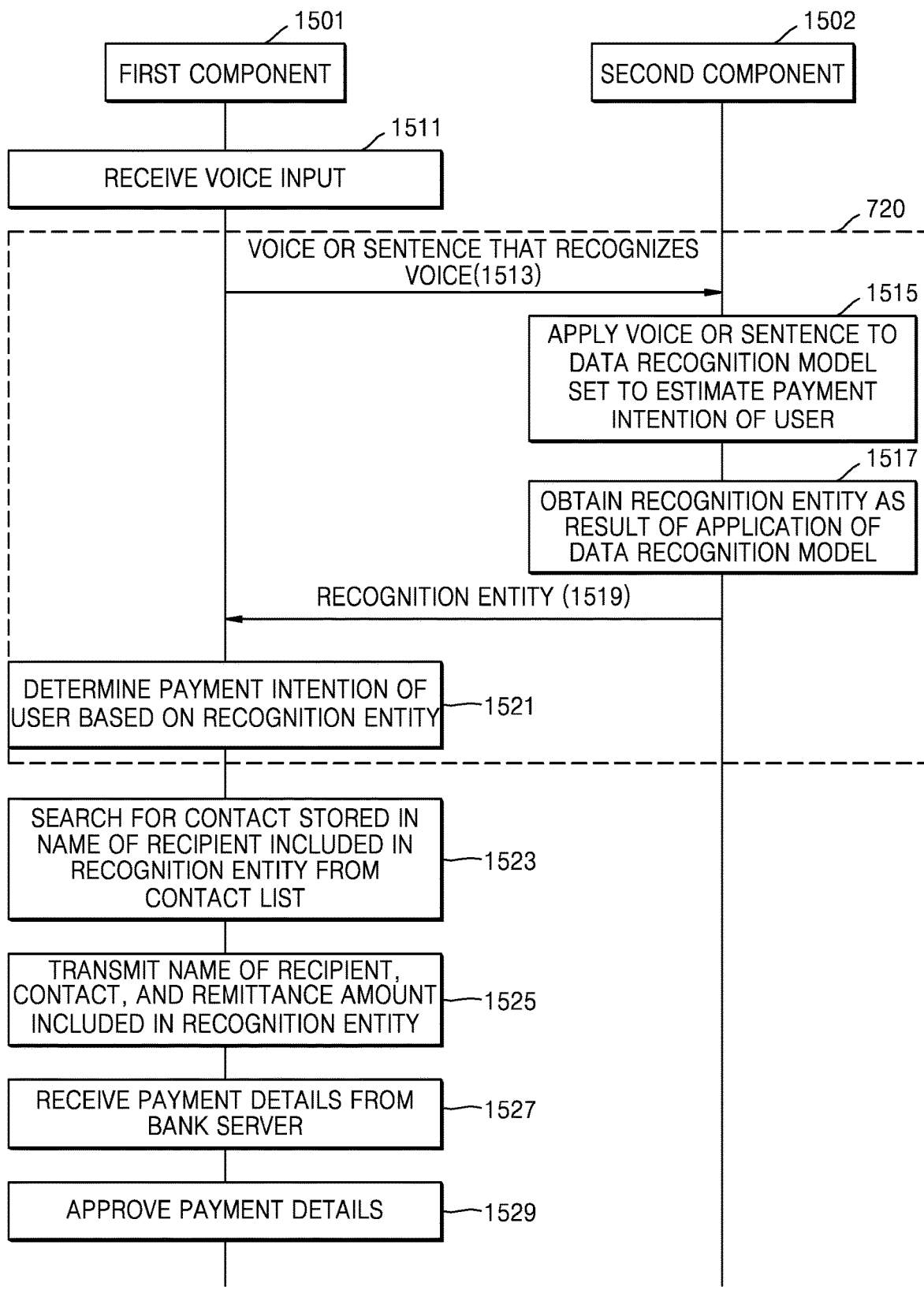

FIGS. 15 and 16 are flowcharts of a network system using a data recognition model according to some non-limiting example embodiments.

In FIGS. 15 and 16, the network system may include first components 1501 and 1601 and second components 1502 and 1602. Here, the first components 1501 and 1601 may be the device 1000, and the second components 1502 and 1602 may be the server 2000 that stores a data analysis model. Alternatively, the first components 1501 and 1601 may be a general purpose processor, and the second components 1502 and 1602 may be an AI dedicated processor. Alternatively, the first components 1501 and 1601 may be at least one application, and the second components 1502 and 1602 may be an OS. That is, the second components 1502 and 1602 may be components that are more integrated and dedicated and less delayed than the first components 1501 and 1601 and have better performance and more resources than the first components 1501 and 1601 and may process many operations required for creating, updating, or applying a data recognition model more quickly and effectively than the first components 1501 and 1601.

In this case, an interface for transmitting/receiving data between the first components 1501 and 1601 and the second components 1502 and 1602 may be defined.

For example, an application program interface (API) having learning data to be applied to the data recognition model as a factor value (or a medium value or a transfer value) may be defined. The API may be defined as a set of subroutines or functions that may be called for any processing of any protocol (e.g., a protocol defined in the device 1000) to another protocol (e.g., a protocol defined in the server 2000). That is, an environment in which an operation of another protocol may be performed in any one protocol through the API may be provided.

In FIG. 15, the first component 1501 may analyze a remittance intention of a user by using a data recognition model.

In operation 1511, the first component 1501 may receive a user's voice uttered with the remittance intention.

In operation 1513, the first component 1501 may transmit the received voice input or a sentence used to recognize the received voice to the second component 1502. For example, the first component 1501 may apply a voice input or a sentence as a factor value of an API function provided for use of the data recognition model. In this case, the API function may transmit the voice input or the sentence to the second component 1502 as recognition data to be applied to the data recognition model. At this time, the voice input or the sentence may be changed and transmitted according to a promised communication format.

In operation 1515, the second component 1502 may apply the received voice input or sentence to a data recognition model set to estimate the remittance intention of the user.

As a result of application, in operation 1517, the second component 1502 may obtain a recognition entity. For example, the recognition entity may include at least one of user information, recipient information (e.g., a name of a recipient), a remittance amount, and a remittance instruction.

In operation 1519, the second component 1502 may transmit the recognition entity to the first component 1501. At this time, the recognition entity may be changed and transmitted according to the promised communication format.

In operation 1521, the first component 1501 may determine that the user's voice input has the remittance intention based on the recognition entity. For example, the first component 1501 may determine that the user's voice has the remittance intention if the 'proceed with remittance, the name of the recipient, and the remittance amount' are included as remittance instruction values of the recognizing entity.

Here, operations 1513 to 1521 may correspond to an embodiment of a process in which the device 10 analyzes the received voice to determine the remittance intention of the user in operation 720 of FIG. 2.

If it is determined in operation 1521 that the user's voice has the remittance intention, the first component 1501 may search a contact list for a contact corresponding to the name of the recipient included in the recognition entity in operation 1523.

In operations 1525, 1527 and 1529, the first component 1501 may approve details to send money to an account number of the recipient based on the found contact of the recipient. The corresponding process corresponds to operations 740 to 760 of FIG. 7, and a redundant description thereof will be omitted.

In FIG. 16, the first component 1601 may analyze a payment intention of the user by using the data recognition model.

In operation 1611, the first component 1601 may provide payment details. For example, the first component 1601 may display the payment details on a screen or output the payment details by voice.

The user may check the payment details displayed on the screen, and may express whether or not to pay by voice input.

In operation 1613, the first component 1601 may receive a user's voice input.

In operation 1615, the first component 1601 may transmit the received voice input or a sentence that recognizes the received voice to the second component 1602. For example, the first component 1601 may apply a voice input or a sentence as a factor value of an API function provided for use of the data recognition model. In this case, the API function may transmit the voice input or the sentence to the second component 1602 as recognition data to be applied to the data recognition model. At this time, the voice input or the sentence may be changed and transmitted according to a promised communication format.

In operation 1617, the second component 1602 may apply the received voice or the sentence to a data recognition model set to estimate the payment intention of the user.

As a result of application, in operation 1619, the second component 1602 may obtain a recognition entity. For example, the recognition entity may include, without limitation, at least one of payment means, a payment item, a payment method and a payment instruction.

In operation 1621, the second component 1602 may transmit the recognition entity to the first component 1601. At this time, the recognition entity may be changed and transmitted according to the promised communication format.

In operation 1623, the first component 1601 may determine that the user's voice has the payment intention based on the recognition entity. For example, if 'cancel payment' is included as a payment instruction value of the recognition entity, the first component 1601 may determine that the user's voice has an intention not to proceed with payment. On the other hand, if 'proceed with payment' is included as the payment instruction value of the recognition entity, the first component 1601 may determine that the user's voice has an intention to proceed with payment.

Here, operations 1615 to 1623 may correspond to an embodiment of a process in which the device 10 analyzes the received voice and determines the payment intention of the user in operation 1030 of FIG. 10 described above.

If it is determined that the user's voice input has the payment intention, the first component 1601 may transmit payment information to a card company if user authentication through voice is successful in operations 1625 and 1627. The corresponding process corresponds to operations 1040 and 1050 of FIG. 10, and a redundant description thereof is omitted.

One or more example embodiments may be implemented using a recording medium including computer-executable instructions such as a program module executed by a computer system. A non-transitory computer-readable recording medium may be an arbitrary available medium which may be accessed by a computer system and includes all types of volatile and non-volatile media and separated and non-separated media. Also, the non-transitory computer-readable recording medium may include all types of computer storage media and communication media. The computer storage media include all types of volatile and non-volatile and separated and non-separated media implemented by an arbitrary method or technique for storing information such as computer-readable instructions, a data structure, a program module, or other data. The communication media typically include computer-readable instructions, a data structure, a program module, other pieces of data of a modulated signal, other transmission mechanisms, and arbitrary information delivery media.

Furthermore, the method according to the embodiments may be provided as a computer program product.

The computer program product may include a software program, a computer-readable storage medium storing the software program, or a product traded between a seller and a purchaser.

For example, the computer program product may include a product (e.g. a downloadable app) in the form of a software program distributed electronically via the device 10 or a manufacturer of the device 10 or an electronic market (e.g. Google Play Store, App Store). For electronic distribution, at least a part of the software program may be stored in a storage medium or may be created temporarily. In this case, the storage medium may be a storage medium of a manufacturer or a server of the electronic market, or a relay server.

Also, in the specification, "unit" may be a hardware component such as a processor or a circuit and/or a software component to be executed by a hardware component such as a processor.

The example embodiments described above are only illustrative, and it will be understood by those of ordinary skill in the art that various changes in form and details may be made therein without changing the technical spirit of the present disclosure. Therefore, the example embodiments should be understood in the illustrative sense only and not for the purpose of limitation. For example, each component described as a single type may be carried out by being distributed, and likewise, components described as a distributed type may also be carried out by being coupled.

It should be understood that example embodiments described herein should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope as defined by the following claims.

What is claimed is:

1. A device comprising:
 a memory;
 a microphone; and
 at least one processor configured to execute a program stored in the memory to control the device to perform operations for sending money to a recipient comprising:
  receiving, by the microphone, a voice input;
  analyzing the received voice input using a pre-built data recognition model to estimate payment intention using an artificial intelligence (AI) algorithm, the data recognition model being customized for use environment of the device;
  obtaining, using the data recognition model, the payment intention of a user based on the analyzed voice input comprising at least one of a name of a recipient, remittance amount, or a remittance instruction;
  obtaining at least one contact information from a stored contact list based on the name of the recipient identified from the received voice input;
  obtaining user input for selecting a contact information from among the at least one contact information;
  transmitting the name of the recipient and the contact information selected based on the user input to a server together with the remittance amount;
  receiving, from the server, remittance information generated based on the transmitted remittance amount;
  receiving a feedback input for either approving the received remittance information to send the money to the recipient or rejecting the remittance information to cancel sending of the money to the recipient; and
  updating the data recognition model using the feedback input as an evaluation of payment intention of the user obtained using the data recognition model,
 wherein the feedback input for approving the remittance information comprises user information including at least one of a fingerprint, an iris scan, a facial image, a vein pattern imagine, or the voice of the user, and
 wherein the remittance information is identified as being approved based on the user information having a similarity equal to or greater than corresponding user information stored in the memory.

2. The device of claim 1, wherein the obtaining of the payment intention of the user comprises learning a pattern through the received voice input when the user sends money.

3. The device of claim 1, wherein the at least one processor is configured to execute the program to control the device to perform further operations comprising:
 authenticating that the received voice input is a voice of a user of the device,
 wherein the payment intention of the user is obtained based on the received voice input being authenticated as the voice of the user of the device.

4. The device of claim 1, wherein the at least one processor is configured to execute the program to control the device to perform further operations comprising:
 displaying the remittance information, and
 wherein the remittance information comprises an account number of the recipient.

5. The device of claim 1, wherein the data recognition model is a model based on an artificial intelligence (AI) algorithm using learning entity values extracted from learning data comprising voice input or text, and
 wherein the learning entity values comprise values for at least one of user information, recipient information, a remittance amount, or a remittance instruction.

6. The device of claim 1, wherein the determining of the payment intention of the user is based on recognition entity values obtained as a result of applying the received voice input to the data recognition model,
 wherein the recognition entity values comprise values for at least one of user information, recipient information, a remittance amount, or a remittance instruction.

7. A paying method comprising:
 receiving, by a microphone, a voice input of a user;
 analyzing the received voice input using a pre-built data recognition model to estimate payment intention using an artificial intelligence (AI) algorithm, the data recognition model being customized for use environment of the device;
 obtaining, using the data recognition model, the payment intention of a user based on the analyzed voice input comprising at least one of name of a recipient, remittance amount, or a remittance instruction;

obtaining at least one contact information from a stored contact list based on the name of the recipient identified from the received voice input;

transmitting the name of the recipient and contact information selected from the at least one contact information based on user input to a server together with the remittance amount;

receiving, from the server, remittance information generated based on the transmitted remittance amount;

receiving a feedback input for either approving the received remittance information to send money to the recipient or rejecting the remittance information to cancel sending of the money to the recipient; and updating the data recognition model using the feedback input as an evaluation of payment intention of the user obtained using the data recognition model, wherein the feedback input for approving the remittance information comprises user information including at least one of a fingerprint, an iris scan, a facial image, a vein pattern image, or the voice of the user, and wherein the remittance information is identified as being approved based on the user information having a similarity equal to or greater than corresponding user information store in the memory.

8. The paying method of claim 7, wherein the obtaining of the payment intention of the user comprises learning a pattern through the received voice input when the user sends money.

9. The paying method of claim 7, further comprising:
authenticating that the received voice is a voice of a user of a device, and
obtaining the payment intention of the user based on the received voice input being authenticated as the voice of the user of the device.

10. The paying method of claim 7, further comprising:
displaying the remittance information,
wherein the remittance comprises information an account number of the recipient.

11. The paying method of claim 7, wherein the data recognition model is a model based on an artificial intelligence (AI) algorithm using learning entity values extracted from learning data comprising voice input or text, and
wherein the learning entity values comprise values for at least one of user information, recipient information, a remittance amount, or a remittance instruction.

12. The paying method of claim 7, wherein the determining of the payment intention of the user is based on recognition entity values obtained as a result of applying the received voice to the data recognition model,
wherein the recognition entity values comprise values for at least one of user information, recipient information, a remittance amount, or a remittance instruction.

13. The paying method of claim 7, further comprising:
transmitting the received voice input to an external server for requesting to estimate payment intention of a user; and
receiving the estimated payment intention from the external server,
wherein the payment intention is estimated, by the external server, by analyzing the voice input using a pre-built data recognition model to estimate the payment intention using an artificial intelligence (AI) algorithm.

14. A computer program product comprising a non-transitory computer-readable storage medium storing instructions configured to, when executed, cause a device to perform:
receiving, by a microphone, a voice input;
analyzing the received voice input using a pre-built data recognition model to estimate payment intention using an artificial intelligence (AI) algorithm, the data recognition model being customized for use environment of the device;
obtaining, using the data recognition model, the payment intention of a user based on the analyzed voice input comprising at least one of a name of a recipient, remittance amount, or a remittance instruction;
obtaining at least one contact information from a stored contact list based on the name of the recipient identified from the received voice input;
obtaining user input for selecting a contact information from among the at least one contact information;
transmitting the name of the recipient and the contact information selected based on the user input to a server together with the remittance amount;
receiving, from the server, remittance information generated based on the transmitted remittance amount;
receiving a feedback input for either approving the received remittance information to send money to the recipient or rejecting the remittance information to cancel sending of the money to the recipient; and
updating the data recognition model using the feedback input as an evaluation of payment intention of the user obtained using the data recognition model,
wherein the feedback input for approving the remittance information comprises user information including at least one of a fingerprint, an iris scan, a facial image, a vein pattern image, or the voice of the user, and
wherein the remittance information is identified as being approved based on the user information having a similarity equal to or greater than corresponding user information store in the memory.

* * * * *